United States Patent
Boyd et al.

(10) Patent No.: US 12,547,309 B2
(45) Date of Patent: Feb. 10, 2026

(54) USER INTERFACE PROVIDING REPLY STATE TRANSITION

(71) Applicant: Snap Inc., Santa Monica, CA (US)

(72) Inventors: Nathan Kenneth Boyd, Los Angeles, CA (US); Christie Marie Heikkinen, Sherman Oaks, CA (US); David Phillip Taitz, Los Angeles, CA (US); Jeremy Baker Voss, Los Angeles, CA (US)

(73) Assignee: Snap Inc., Santa Monica, CA (US)

( * ) Notice: Subject to any disclaimer, the term of this patent is extended or adjusted under 35 U.S.C. 154(b) by 124 days.

(21) Appl. No.: 18/346,638

(22) Filed: Jul. 3, 2023

(65) Prior Publication Data
US 2024/0012558 A1 Jan. 11, 2024

Related U.S. Application Data

(60) Provisional application No. 63/367,659, filed on Jul. 5, 2022.

(51) Int. Cl.
*G06F 3/0488* (2022.01)
*H04L 51/00* (2022.01)

(52) U.S. Cl.
CPC ............ *G06F 3/0488* (2013.01); *H04L 51/00* (2013.01)

(58) Field of Classification Search
CPC .............................. G06F 3/0488; H04L 51/00
See application file for complete search history.

(56) References Cited

U.S. PATENT DOCUMENTS

| | | | |
|---|---|---|---|
| 7,971,156 B2 | 6/2011 | Albertson et al. |
| 7,996,793 B2 | 8/2011 | Latta et al. |
| 8,487,938 B2 | 7/2013 | Latta et al. |
| 8,856,691 B2 | 10/2014 | Geisner et al. |
| 9,225,897 B1 | 12/2015 | Sehn et al. |
| 9,230,160 B1 | 1/2016 | Kanter |
| 9,276,886 B1 | 3/2016 | Samaranayake |
| 9,705,831 B2 | 7/2017 | Spiegel |

(Continued)

FOREIGN PATENT DOCUMENTS

| | | |
|---|---|---|
| CN | 103049761 | 8/2016 |
| EP | 3707693 | 9/2020 |

(Continued)

OTHER PUBLICATIONS

"Surprise!", [Online] Retrieved from the Internet: <URL: https://www.snap.com/en-US/news/post/surprise>, (Oct. 3, 2013), 1 pg.

(Continued)

*Primary Examiner* — Seth A Silverman
(74) *Attorney, Agent, or Firm* — Schwegman Lundberg & Woessner, P.A.

(57) ABSTRACT

A user input content item is presented in a viewing interface of an interaction application executing on a user device. The user input content item is shared with a viewing user by a sending user via an interaction system. A press and hold operation by the viewing user related to the presentation of the user input content item is detected. Responsive to the detection of the press and hold operation, the interaction application is automatically transitioned to a reply state. Within the reply state, a reply mechanism is activated to enable the viewing user to generate a reply message to the sending user.

20 Claims, 14 Drawing Sheets

(56) References Cited

U.S. PATENT DOCUMENTS

| | | |
|---|---|---|
| 9,742,713 B2 | 8/2017 | Spiegel et al. |
| 10,102,423 B2 | 10/2018 | Shaburov et al. |
| 10,284,508 B1 | 5/2019 | Allen et al. |
| 10,439,972 B1 | 10/2019 | Spiegel et al. |
| 10,509,466 B1 | 12/2019 | Miller et al. |
| 10,514,876 B2 | 12/2019 | Sehn |
| 10,579,869 B1 | 3/2020 | Xiong et al. |
| 10,591,730 B2 | 3/2020 | Rodriguez, II et al. |
| 10,614,855 B2 | 4/2020 | Huang |
| 10,748,347 B1 | 8/2020 | Li et al. |
| 10,817,142 B1* | 10/2020 | Paul ............... G06F 3/0482 |
| 10,942,978 B1* | 3/2021 | Paul ............... G06F 16/44 |
| 10,958,608 B1 | 3/2021 | Allen et al. |
| 10,962,809 B1 | 3/2021 | Castañeda |
| 10,996,846 B2 | 5/2021 | Robertson et al. |
| 10,997,787 B2 | 5/2021 | Ge et al. |
| 11,012,390 B1 | 5/2021 | Al Majid et al. |
| 11,030,454 B1 | 6/2021 | Xiong et al. |
| 11,036,368 B1 | 6/2021 | Al Majid et al. |
| 11,062,498 B1 | 7/2021 | Voss et al. |
| 11,087,728 B1 | 8/2021 | Canberk et al. |
| 11,092,998 B1 | 8/2021 | Castañeda et al. |
| 11,106,342 B1 | 8/2021 | Al Majid et al. |
| 11,126,206 B2 | 9/2021 | Meisenholder et al. |
| 11,143,867 B2 | 10/2021 | Rodriguez, II |
| 11,169,600 B1 | 11/2021 | Canberk et al. |
| 11,188,215 B1 | 11/2021 | Holland |
| 11,227,626 B1 | 1/2022 | Krishnan Gorumkonda et al. |
| 11,307,747 B2 | 4/2022 | Dancie et al. |
| 11,531,402 B1 | 12/2022 | Stolzenberg |
| 11,546,505 B2 | 1/2023 | Canberk |
| 2006/0085812 A1 | 4/2006 | Shishegar et al. |
| 2009/0012788 A1 | 1/2009 | Gilbert et al. |
| 2011/0301934 A1 | 12/2011 | Tardif |
| 2013/0226453 A1* | 8/2013 | Trussel ............. H04L 51/224 709/206 |
| 2014/0171036 A1 | 6/2014 | Simmons |
| 2015/0120293 A1 | 4/2015 | Wohlert et al. |
| 2015/0160808 A1 | 6/2015 | Walkin et al. |
| 2015/0370320 A1 | 12/2015 | Connor |
| 2016/0324488 A1 | 11/2016 | Olsen |
| 2017/0123487 A1 | 5/2017 | Hazra et al. |
| 2017/0277684 A1 | 9/2017 | Dharmarajan Mary |
| 2017/0277685 A1 | 9/2017 | Takumi |
| 2017/0351910 A1 | 12/2017 | Elwazer et al. |
| 2018/0158370 A1 | 6/2018 | Pryor |
| 2019/0146219 A1 | 5/2019 | Rodriguez, II |
| 2020/0005387 A1* | 1/2020 | Rav-Acha ............ G06Q 30/0627 |
| 2020/0287860 A1* | 9/2020 | Stamatiou ............ H04L 51/214 |
| 2021/0011612 A1 | 1/2021 | Dancie et al. |
| 2021/0074016 A1 | 3/2021 | Li et al. |
| 2021/0166732 A1 | 6/2021 | Shaburova et al. |
| 2021/0174034 A1 | 6/2021 | Retek et al. |
| 2021/0226908 A1 | 7/2021 | Al Majid et al. |
| 2021/0241529 A1 | 8/2021 | Cowburn et al. |
| 2021/0286939 A1* | 9/2021 | Biran ............... G06F 3/04886 |
| 2021/0303075 A1 | 9/2021 | Cowburn et al. |
| 2021/0303077 A1 | 9/2021 | Anvaripour et al. |
| 2021/0303140 A1 | 9/2021 | Mourkogiannis |
| 2021/0382564 A1 | 12/2021 | Blachly et al. |
| 2021/0397000 A1 | 12/2021 | Rodriguez, II |
| 2021/0405761 A1 | 12/2021 | Canberk |
| 2022/0101606 A1 | 3/2022 | Canberk et al. |
| 2022/0188539 A1 | 6/2022 | Chan et al. |
| 2022/0206588 A1 | 6/2022 | Canberk et al. |
| 2022/0300730 A1 | 9/2022 | Eirinberg et al. |
| 2022/0300731 A1 | 9/2022 | Eirinberg et al. |
| 2022/0301231 A1 | 9/2022 | Eirinberg et al. |
| 2022/0317867 A1* | 10/2022 | Narayanan .......... G06F 3/04845 |
| 2022/0326781 A1 | 10/2022 | Hwang et al. |
| 2022/0334649 A1 | 10/2022 | Hwang et al. |
| 2022/0375174 A1 | 11/2022 | Arya et al. |
| 2023/0393730 A1 | 12/2023 | Boyd et al. |

FOREIGN PATENT DOCUMENTS

| | | |
|---|---|---|
| EP | 4172726 | 5/2023 |
| EP | 4172730 | 5/2023 |
| KR | 20210002616 A | 1/2021 |
| KR | 20220158824 | 12/2022 |
| WO | 2016168591 | 10/2016 |
| WO | 2018236601 | 12/2018 |
| WO | 2019094618 | 5/2019 |
| WO | 2022005687 | 1/2022 |
| WO | 2022005693 | 1/2022 |
| WO | 2022060549 | 3/2022 |
| WO | 2022066578 | 3/2022 |
| WO | 2022132381 | 6/2022 |
| WO | 2022146678 | 7/2022 |
| WO | 2022198182 | 9/2022 |
| WO | 2022216784 | 10/2022 |
| WO | 2022225761 | 10/2022 |
| WO | 2022245765 | 11/2022 |

OTHER PUBLICATIONS

"International Application Serial No. PCT/US2023/024146, International Search Report mailed Sep. 21, 2023", 3 pgs.

"International Application Serial No. PCT/US2023/024146, Written Opinion mailed Sep. 21, 2023", 4 pgs.

"International Application Serial No. PCT/US2023/069580, International Search Report mailed Oct. 20, 2023", 3 pgs.

"International Application Serial No. PCT/US2023/069580, Written Opinion mailed Oct. 20, 2023", 4 pgs.

Buscemi, Scott, "Snapchat introduces 'Stories', a narrative built with snaps", [Online] Retrieved from the Internet: <URL: https://9to5mac.com/2013/10/03/snapchat-introduces-stories-a-narrative-built-with-snaps/>, (Oct. 3, 2013), 2 pgs.

Etherington, Darrell, "Snapchat Gets Its Own Timeline With Snapchat Stories, 24-Hour Photo and Video Tales", [Online] Retrieved from the Internet: <URL: https://techcrunch.com/2013/10/03/snapchat-gets-its-own-timeline-with-snapchat-stories-24-hour-photo-video-tales/>, (Oct. 3, 2013), 2 pgs.

Hamburger, Ellis, "Snapchat's next big thing: 'Stories' that don't just disappear", [Online] Retrieved from the Internet: <URL: https://www.theverge.com/2013/10/3/4791934/snapchats-next-big-thing-stories-that-dont-just-disappear>, (Oct. 3, 2013), 5 pgs.

"U.S. Appl. No. 18/327,569, Examiner Interview Summary mailed Jun. 25, 2025", 2 pgs.

"U.S. Appl. No. 18/327,569, Response filed Jun. 24, 2025 to Non Final Office Action mailed Mar. 24, 2025", 14 pgs.

"U.S. Appl. No. 18/327,569, Non Final Office Action mailed Mar. 24, 2025", 22 pgs.

"International Application Serial No. PCT/US2023/024146, International Preliminary Report on Patentability mailed Dec. 12, 2024", 6 pgs.

"International Application Serial No. PCT/US2023/069580, International Preliminary Report on Patentability mailed Jan. 16, 2025", 6 pgs.

"Korean Application Serial No. 10-2025-7003571, Notice of Preliminary Rejection mailed Dec. 4, 2025", w/ English translation, 19 pgs.

* cited by examiner

USER INTERFACE PROVIDING REPLY STATE TRANSITION

CLAIM OF PRIORITY

This application claims the benefit of priority to U.S. Provisional Application Ser. No. 63/367,659, filed on Jul. 5, 2022, which is incorporated herein by reference in its entirety.

BACKGROUND

The popularity of computer-implemented programs that permit users to access and interact with content and other users online continues to grow. Various computer-implemented applications exist that permit users to share content with other users through interaction applications, e.g., messaging clients. Some computer-implemented applications can be designed to run on a mobile device, such as a phone, a tablet, or a wearable device, while having a backend service provided on a server computer system to perform certain operations, e.g., those that may require resources greater than is reasonable to perform at a user device.

An interaction application, such as a messaging client executing at a user device, may enable a sending user to capture a photo or video, and to share captured or viewed content to another device for viewing by a viewing user. A viewing user may use a reply user interface to respond to the content, e.g., by sending a text reply to the sending user, or by capturing and sharing a further photo or video in response to the content shared by the sending user.

BRIEF DESCRIPTION OF THE SEVERAL VIEWS OF THE DRAWINGS

In the drawings, which are not necessarily drawn to scale, like numerals may describe similar components in different views. To easily identify the discussion of any particular element or act, the most significant digit or digits in a reference number refer to the figure number in which that element is first introduced. Some non-limiting examples are illustrated in the figures of the accompanying drawings in which.

DETAILED DESCRIPTION

Figure 1:
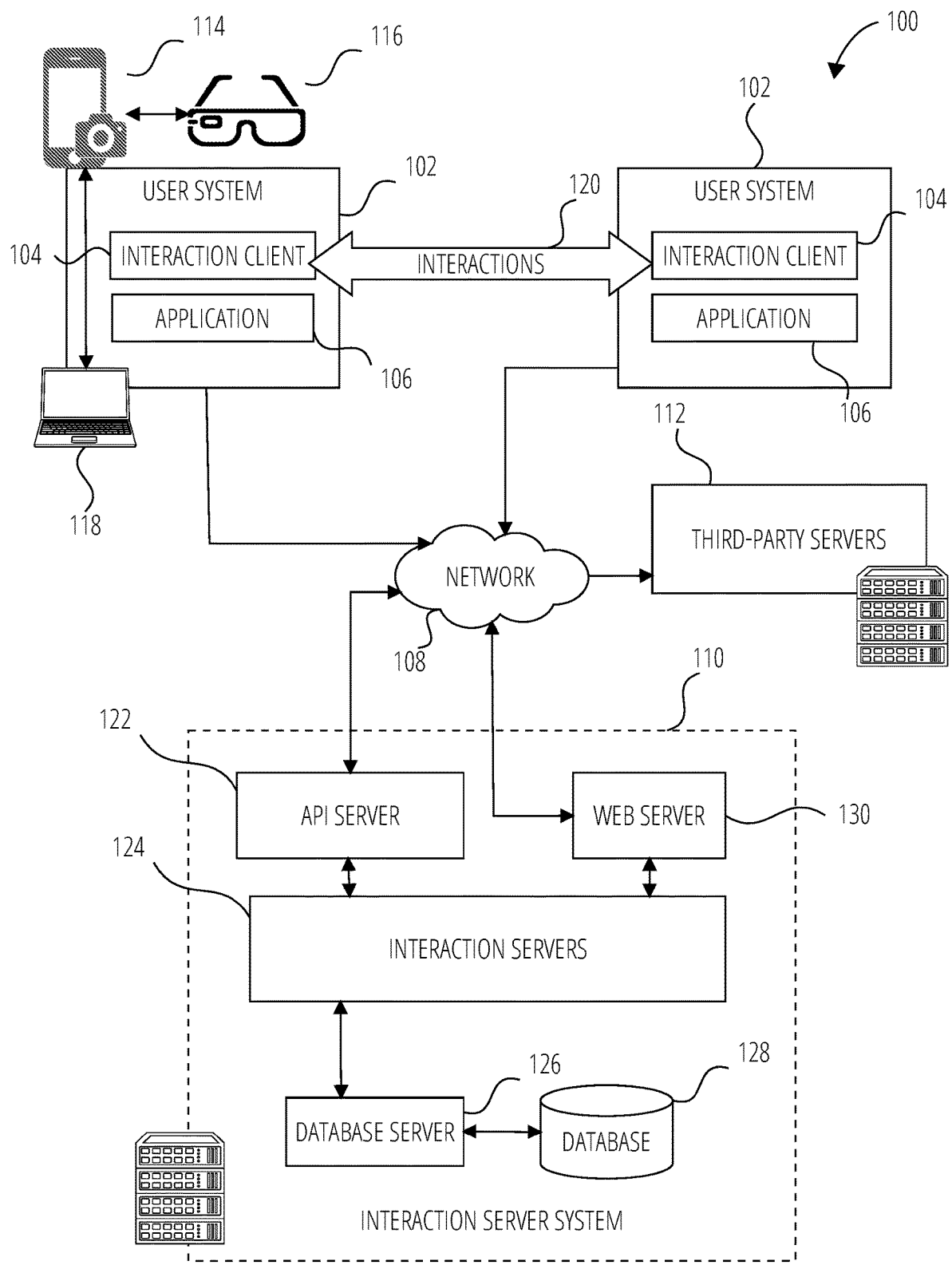
FIG. 1 is a diagrammatic representation of a networked environment in which the present disclosure may be deployed, according to some examples.

Examples in the present disclosure describe a user interface that provides an efficient and intuitive reply state transition, thereby facilitating communication between users of an interaction system. If a user is viewing a user input content item, e.g., watching another user's "story," and wishes to reply, a user may perform a press and hold operation to initiate a reply state transition.

In some examples, a user input content item is presented in a viewing interface of an interaction application executing on a user device. The user input content item is shared with a viewing user by a sending user. A press and hold operation by the viewing user related to the presentation of the user input content item is detected. Responsive to the detection of the press and hold operation, the interaction application is automatically transitioned to a reply state. Within the reply state, a reply mechanism is activated to enable the viewing user to generate a reply message to the sending user.

The reply mechanism may include a reply interface that provides a plurality of interface components to facilitate the creation or transmission of the reply message. In some examples, the reply mechanism enables the viewing user to address the reply message to a further user of the interaction system, in addition to the sending user, e.g., by presenting one or more user addition cards within the reply interface.

In some examples, a press and hold gesture allows a user to cause activation of a paused state. Within the paused state, a release gesture may finalize the transition to the reply state, while an alternative gesture (e.g., a swipe down gesture) may cause a transition back to a viewing state, thus canceling the reply.

An example technical problem of providing a user interface with an intuitive reply state transition can be addressed by example systems described herein that automatically initiate such a transition based on a press and hold operation. Further, in cases where content is presented in a time-limited manner, e.g., as part of a "story" or a video, user interfaces described herein may utilize a paused state to make it easier for a user to reply to the viewed content item.

Another example technical problem of incorporating a flexible and efficient reply mechanism into a reply state transition can be addressed by example systems described herein that enable a viewing user to generate a further user input content item or add further users (in addition to the sending user) to a reply, without having to make selections or input instructions outside of the reply mechanism. Further, example systems described herein detect and respond to a voiding action, such as a swiping gesture, providing a solution to an example technical problem of enabling a user to cancel a reply state transition.

When the effects in this disclosure are considered in aggregate, one or more of the methodologies described herein may obviate a need for certain efforts or resources that otherwise would be involved in executing interaction applications. Computing resources used by one or more machines, databases, or networks may be more efficiently utilized or even reduced, e.g., as a result of automatic interface transitions, or as a result of a reduced number of selections being required to achieve an effect. Examples of such computing resources may include processor cycles, network traffic, memory usage, graphics processing unit (GPU) resources, data storage capacity, power consumption, and cooling capacity.

Networked Computing Environment

FIG. 1 is a block diagram showing an example interaction system 100 for facilitating interactions (e.g., exchanging text messages, conducting text audio and video calls, or playing games) over a network. The interaction system 100 includes multiple user systems 102, each of which hosts multiple applications, including an interaction client 104 and other applications 106. Each interaction client 104 is communicatively coupled, via one or more communication networks including a network 108 (e.g., the Internet), to other instances of the interaction client 104 (e.g., hosted on respective other user systems 102), an interaction server system 110 and third-party servers 112). An interaction client 104 can also communicate with locally hosted applications 106 using Applications Program Interfaces (APIs).

Each user system 102 may include multiple user devices, such as a mobile device 114, head-wearable apparatus 116, and a computer client device 118 that are communicatively connected to exchange data and messages. An interaction client 104 interacts with other interaction clients 104 and with the interaction server system 110 via the network 108. The data exchanged between the interaction clients 104 (e.g., interactions 120) and between the interaction clients 104 and the interaction server system 110 includes functions (e.g., commands to invoke functions) and payload data (e.g., text, audio, video, or other multimedia data).

The interaction server system 110 provides server-side functionality via the network 108 to the interaction clients 104. While certain functions of the interaction system 100 are described herein as being performed by either an interaction client 104 or by the interaction server system 110, the location of certain functionality either within the interaction client 104 or the interaction server system 110 may be a design choice. For example, it may be technically preferable to initially deploy particular technology and functionality within the interaction server system 110 but to migrate this technology and functionality to the interaction client 104 at a later stage, where a user system 102 has sufficient processing capacity.

The interaction server system 110 supports various services and operations that are provided to the interaction clients 104. Such operations include transmitting data to, receiving data from, and processing data generated by the interaction clients 104. This data may include message content, client device information, geolocation information, media augmentation and overlays, message content persistence conditions, entity relationship information, and live event information. Data exchanges within the interaction system 100 are invoked and controlled through functions available via user interfaces of the interaction clients 104.

Turning now specifically to the interaction server system 110, an API server 122 is coupled to and provides programmatic interfaces to interaction servers 124, making the functions of the interaction servers 124 accessible to interaction clients 104, other applications 106, and third-party server 112. The interaction servers 124 are communicatively coupled to a database server 126, facilitating access to a database 128 that stores data associated with interactions processed by the interaction servers 124. Similarly, a web server 130 is coupled to the interaction servers 124 and provides web-based interfaces to the interaction servers 124. To this end, the web server 130 processes incoming network requests over the Hypertext Transfer Protocol (HTTP) and several other related protocols.

The API server 122 receives and transmits interaction data (e.g., commands and message payloads) between the interaction servers 124 and the user systems 102 (and, for example, interaction clients 104 and other application 106) and the third-party server 112. Specifically, the API server 122 provides a set of interfaces (e.g., routines and protocols) that can be called or queried by the interaction client 104 and other applications 106 to invoke functionality of the interaction servers 124. The API server 122 exposes various functions supported by the interaction servers 124, including account registration; login functionality; the sending of interaction data, via the interaction servers 124, from a particular interaction client 104 to another interaction client 104; the communication of media files (e.g., images or video) from an interaction client 104 to the interaction servers 124; the settings of a collection of media data (e.g., a story); settings relating to states of the interaction client 104 (e.g., a view state, paused state, or reply state as described below); the retrieval of a list of friends of a user of a user system 102; the retrieval of messages and content; the retrieval of entities to add to a "conversation;" the addition and deletion of entities (e.g., friends) to an entity graph (e.g., an entity graph); the location of friends within an entity graph; and opening an application event (e.g., relating to the interaction client 104).

The interaction servers 124 host multiple systems and subsystems, described below with reference to FIG. 2.

System Architecture

Figure 2:
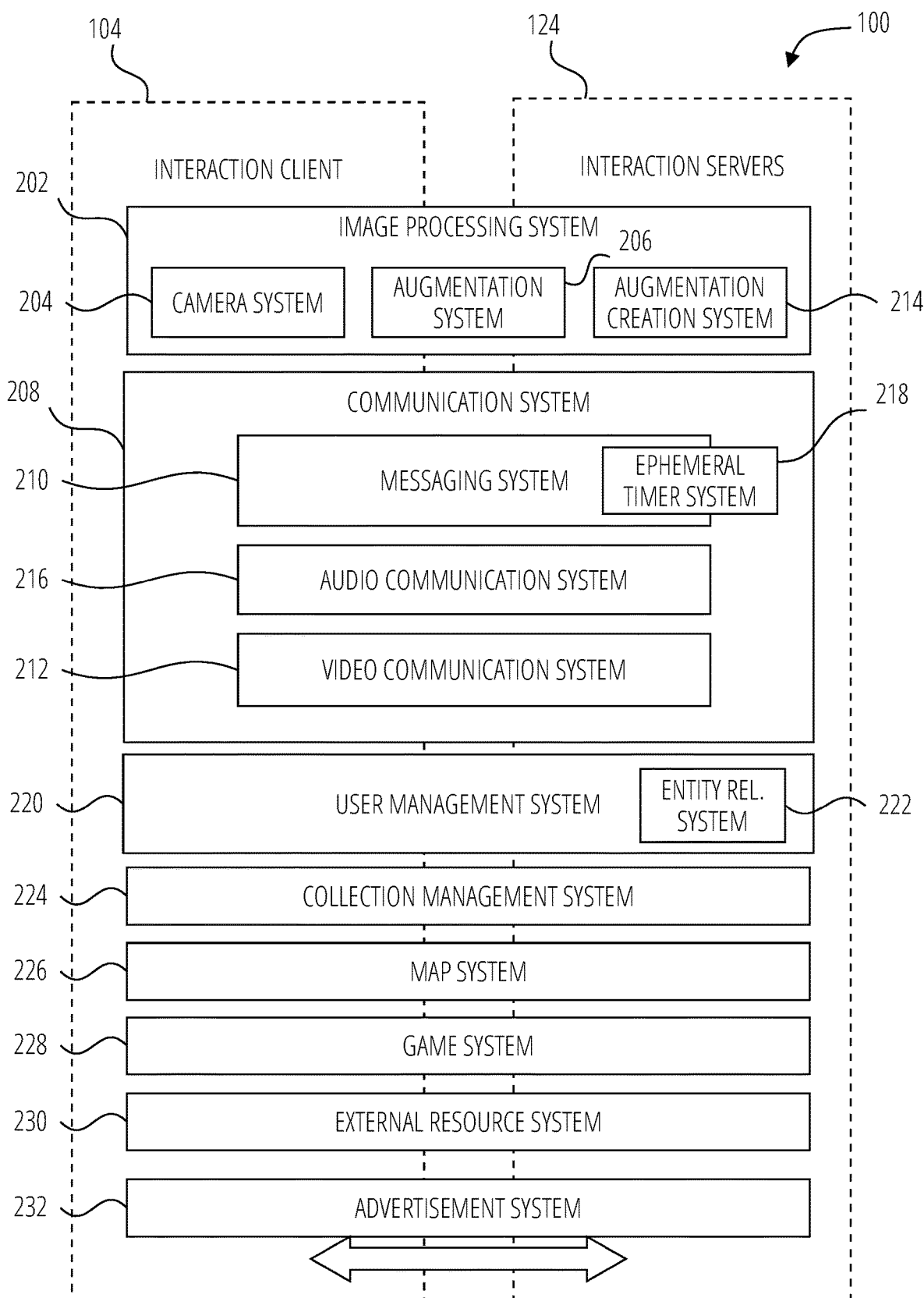
FIG. 2 is a diagrammatic representation of an interaction system, according to some examples, that has both client-side and server-side functionality.

FIG. 2 is a block diagram illustrating further details regarding the interaction system 100, according to some examples. Specifically, the interaction system 100 is shown to comprise the interaction client 104 and the interaction servers 124. The interaction system 100 embodies multiple subsystems, which are supported on the client-side by the interaction client 104 and on the server-side by the interaction servers 124. Example subsystems are discussed below.

An image processing system 202 provides various functions that enable a user to capture and augment (e.g., annotate or otherwise modify or edit) media content associated with a message. A camera system 204 includes control software (e.g., in a camera application) that interacts with and controls camera hardware (e.g., directly or via operating system controls) of the user system 102 to modify and augment real-time images captured and displayed via the interaction client 104.

An augmentation system 206 provides functions related to the generation and publishing of augmentations (e.g., media overlays) for images captured in real-time by cameras of the user system 102 or retrieved from memory of the user system 102. For example, the augmentation system 206 operatively selects, presents, and displays media overlays (e.g., an image filter or an image lens) to the interaction client 104 for the augmentation of real-time images received via the camera system 204 or stored images retrieved from memory 1202 of a user system 102. These augmentations are selected by the augmentation system 206 and presented to a user of an interaction client 104, based on a number of inputs and data, such as for example:

Geolocation of the user system 102; and

Entity relationship information of the user of the user system 102.

An augmentation may include audio and visual content and visual effects. Examples of audio and visual content include pictures, texts, logos, animations, and sound effects. An example of a visual effect includes color overlaying. The audio and visual content or the visual effects can be applied to a media content item (e.g., a photo or video) at user system 102 for communication in a message, or applied to video content, such as a video content stream or feed transmitted from an interaction client 104. As such, the image processing system 202 may interact with, and support, the various subsystems of the communication system 208, such as the messaging system 210 and the video communication system 212.

A media overlay may include text or image data that can be overlaid on top of a photograph taken by the user system 102 or a video stream produced by the user system 102. In some examples, the media overlay may be a location overlay (e.g., Venice beach), a name of a live event, or a name of a merchant overlay (e.g., Beach Coffee House). In further examples, the image processing system 202 uses the geolocation of the user system 102 to identify a media overlay that includes the name of a merchant at the geolocation of the user system 102. The media overlay may include other indicia associated with the merchant. The media overlays may be stored in the databases 128 and accessed through the database server 126.

The image processing system 202 provides a user-based publication platform that enables users to select a geolocation on a map and upload content associated with the selected geolocation. The user may also specify circumstances under which a particular media overlay should be offered to other users. The image processing system 202 generates a media overlay that includes the uploaded content and associates the uploaded content with the selected geolocation.

The augmentation creation system 214 supports augmented reality developer platforms and includes an application for content creators (e.g., artists and developers) to create and publish augmentations (e.g., augmented reality experiences) of the interaction client 104. The augmentation creation system 214 provides a library of built-in features and tools to content creators including, for example, custom shaders, tracking technology, and templates.

In some examples, the augmentation creation system 214 provides a merchant-based publication platform that enables merchants to select a particular augmentation associated with a geolocation via a bidding process. For example, the augmentation creation system 214 associates a media overlay of the highest bidding merchant with a corresponding geolocation for a predefined amount of time.

A communication system 208 is responsible for enabling and processing multiple forms of communication and interaction within the interaction system 100 and includes a messaging system 210, an audio communication system 216, and a video communication system 212. The messaging system 210 may be responsible for enforcing the temporary or time-limited access to content by the interaction clients 104. The messaging system 210 incorporates multiple timers (e.g., within an ephemeral timer system 218) that, based on duration and display parameters associated with a message or collection of messages (e.g., a story), selectively enable access (e.g., for presentation and display) to messages and associated content via the interaction client 104. The messaging system 210 may further be responsible for providing a reply mechanism according to examples described herein, facilitating replies to content items shared by users of the interaction system 100. In some examples, the messaging system 210 enables a user to initiate a reply state transition, e.g., in which a user interface transitions from a view state, to a paused state, and then to a reply state (or directly from the view state to the reply state, or from the paused state back to the view state).

The audio communication system 216 enables and supports audio communications (e.g., real-time audio chat) between multiple interaction clients 104. Similarly, the video communication system 212 enables and supports video communications (e.g., real-time video chat) between multiple interaction clients 104.

A user management system 220 is operationally responsible for the management of user data and profiles, and includes an entity relationship system 222 that maintains information regarding relationships between users of the interaction system 100.

A collection management system 224 is operationally responsible for managing sets or collections of media (e.g., collections of text, image video, and audio data). A collection of content (e.g., messages, including images, video, text, and audio) may be organized into an "event gallery" or an "event story." Such a collection may be made available for a specified time period, such as the duration of an event to which the content relates. For example, content relating to a music concert may be made available as a "story" for the duration of that music concert. The collection management system 224 may also be responsible for publishing an icon that provides notification of a particular collection to the user interface of the interaction client 104. The collection management system 224 includes a curation function that allows a collection manager to manage and curate a particular collection of content. For example, the curation interface enables an event organizer to curate a collection of content relating to a specific event (e.g., delete inappropriate content or redundant messages). Additionally, the collection management system 224 employs machine vision (or image recognition technology) and content rules to curate a content collection automatically. In certain examples, compensation may be paid to a user to include user-generated content into a collection. In such cases, the collection management system 224 operates to automatically make payments to such users to use their content. The collection management system 224 may communicate with the messaging system 210 to enable users to reply to user input content items forming part of content collections, e.g., for a user to reply to a specific item forming part of another user's "story."

A map system 226 provides various geographic location functions and supports the presentation of map-based media content and messages by the interaction client 104. For example, the map system 226 enables the display of user icons or avatars (e.g., stored in profile data 302) on a map to indicate a current or past location of "friends" of a user, as well as media content (e.g., collections of messages including photographs and videos) generated by such friends, within the context of a map. For example, a message posted by a user to the interaction system 100 from a specific geographic location may be displayed within the context of a map at that particular location to "friends" of a specific user on a map interface of the interaction client 104. A user can furthermore share his or her location and status information (e.g., using an appropriate status avatar) with other users of the interaction system 100 via the interaction client 104, with this location and status information being similarly displayed within the context of a map interface of the interaction client 104 to selected users.

A game system 228 provides various gaming functions within the context of the interaction client 104. The interaction client 104 provides a game interface providing a list of available games that can be launched by a user within the context of the interaction client 104 and played with other users of the interaction system 100. The interaction system 100 further enables a particular user to invite other users to participate in the play of a specific game by issuing invitations to such other users from the interaction client 104. The interaction client 104 also supports audio, video, and text messaging (e.g., chats) within the context of gameplay, provides a leaderboard for the games, and also supports the provision of in-game rewards (e.g., coins and items).

An external resource system 230 provides an interface for the interaction client 104 to communicate with remote servers (e.g., third-party servers 112) to launch or access external resources, i.e., applications or applets. Each third-party server 112 hosts, for example, a markup language (e.g., HTML5) based application or a small-scale version of an application (e.g., game, utility, payment, or ride-sharing application). The interaction client 104 may launch a web-based resource (e.g., application) by accessing the HTML5 file from the third-party servers 112 associated with the web-based resource. Applications hosted by third-party servers 112 are programmed in JavaScript leveraging a Software Development Kit (SDK) provided by the interaction servers 124. The SDK includes Application Programming Interfaces (APIs) with functions that can be called or invoked by the web-based application. The interaction servers 124 host a JavaScript library that provides a given external resource access to specific user data of the interaction client 104. HTML5 is an example of technology for programming games, but applications and resources programmed based on other technologies can be used.

To integrate the functions of the SDK into the web-based resource, the SDK is downloaded by the third-party server 112 from the interaction servers 124 or is otherwise received by the third-party server 112. Once downloaded or received, the SDK is included as part of the application code of a web-based external resource. The code of the web-based resource can then call or invoke certain functions of the SDK to integrate features of the interaction client 104 into the web-based resource.

The SDK stored on the interaction server system 110 effectively provides the bridge between an external resource (e.g., applications 106 or applets) and the interaction client 104. This gives the user a seamless experience of communicating with other users on the interaction client 104 while also preserving the look and feel of the interaction client 104. To bridge communications between an external resource and an interaction client 104, the SDK facilitates communication between third-party servers 112 and the interaction client 104. A WebViewJavaScriptBridge running on a user system 102 establishes two one-way communication channels between an external resource and the interaction client 104. Messages are sent between the external resource and the interaction client 104 via these communication channels asynchronously. Each SDK function invocation is sent as a message and callback. Each SDK function is implemented by constructing a unique callback identifier and sending a message with that callback identifier.

By using the SDK, not all information from the interaction client 104 is shared with third-party servers 112. The SDK limits which information is shared based on the needs of the external resource. Each third-party server 112 provides an HTML5 file corresponding to the web-based external resource to interaction servers 124. The interaction servers 124 can add a visual representation (such as a box art or other graphic) of the web-based external resource in the interaction client 104. Once the user selects the visual representation or instructs the interaction client 104 through a graphical user interface of the interaction client 104 to access features of the web-based external resource, the interaction client 104 obtains the HTML5 file and instantiates the resources to access the features of the web-based external resource.

The interaction client 104 presents a graphical user interface (e.g., a landing page or title screen) for an external resource. During, before, or after presenting the landing page or title screen, the interaction client 104 determines whether the launched external resource has been previously authorized to access user data of the interaction client 104. In response to determining that the launched external resource has been previously authorized to access user data of the interaction client 104, the interaction client 104 presents another graphical user interface of the external resource that includes functions and features of the external resource. In response to determining that the launched external resource has not been previously authorized to access user data of the interaction client 104, after a threshold period of time (e.g., 3 seconds) of displaying the landing page or title screen of the external resource, the interaction client 104 slides up (e.g., animates a menu as surfacing from a bottom of the screen to a middle or other portion of the screen) a menu for authorizing the external resource to access the user data. The menu identifies the type of user data that the external resource will be authorized to use. In response to receiving a user selection of an accept option, the interaction client 104 adds the external resource to a list of authorized external resources and allows the external resource to access user data from the interaction client 104. The external resource is authorized by the interaction client 104 to access the user data under an OAuth 2 framework.

The interaction client 104 controls the type of user data that is shared with external resources based on the type of external resource being authorized. For example, external resources that include full-scale applications (e.g., an application 106) are provided with access to a first type of user data (e.g., two-dimensional avatars of users with or without different avatar characteristics). As another example, external resources that include small-scale versions of applications (e.g., web-based versions of applications) are provided with access to a second type of user data (e.g., payment information, two-dimensional avatars of users, three-dimensional avatars of users, and avatars with various avatar characteristics). Avatar characteristics include different ways to customize a look and feel of an avatar, such as different poses, facial features, clothing, and so forth.

An advertisement system 232 operationally enables the purchasing of advertisements by third parties for presentation to end-users via the interaction clients 104 and also handles the delivery and presentation of these advertisements.

Data Architecture

Figure 3:
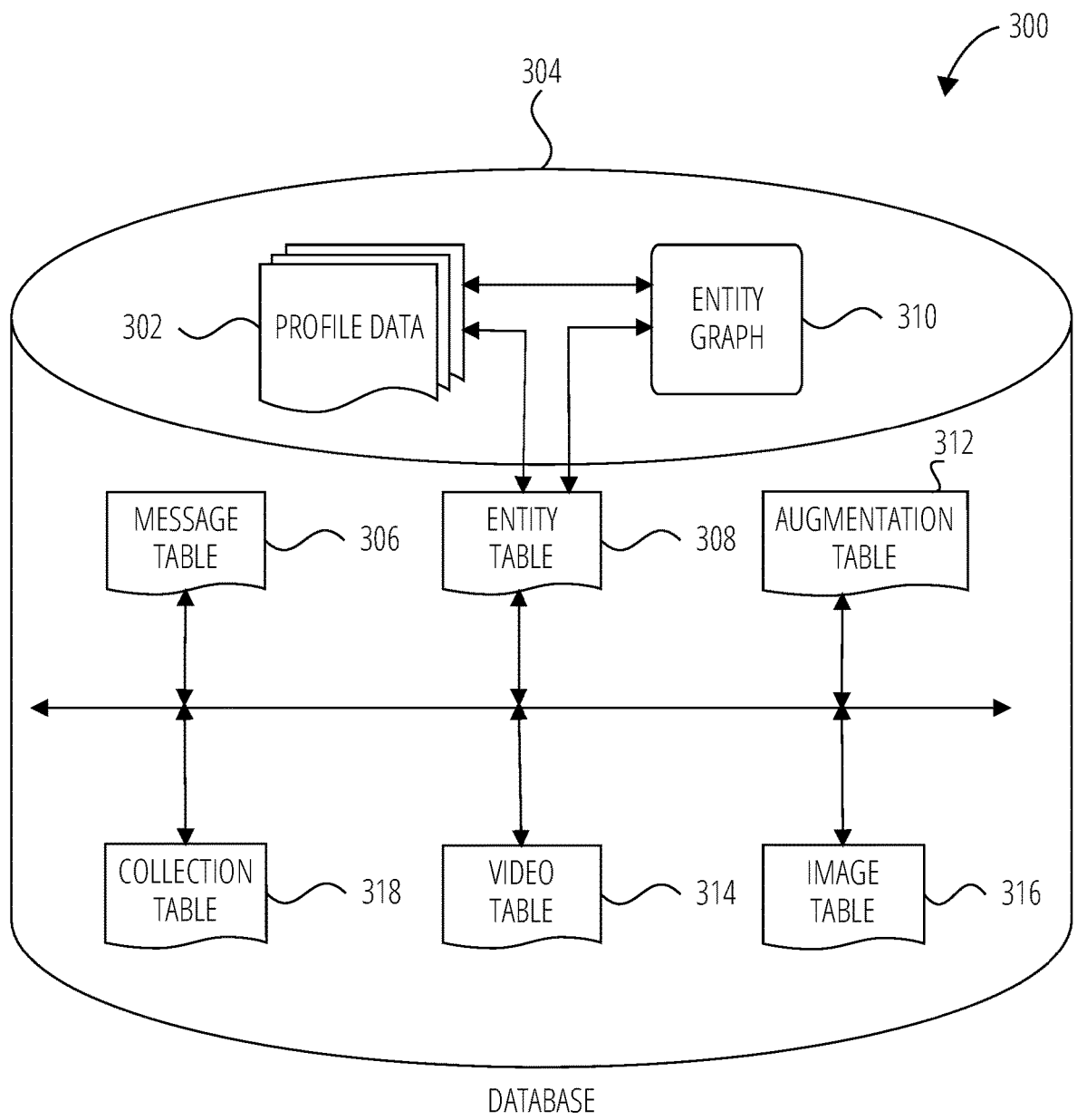
FIG. 3 is a diagrammatic representation of a data structure as maintained in a database, according to some examples.

FIG. 3 is a schematic diagram illustrating data structures 300, which may be stored in the database 304 of the interaction server system 110, according to certain examples. While the content of the database 304 is shown to comprise multiple tables, it will be appreciated that the data could be stored in other types of data structures (e.g., as an object-oriented database).

The database 304 includes message data stored within a message table 306. This message data includes, for any particular message, at least message sender data, message recipient (or receiver) data, and a payload. Further details regarding information that may be included in a message, and included within the message data stored in the message table 306, are described below with reference to FIG. 11.

An entity table 308 stores entity data, and is linked (e.g., referentially) to an entity graph 310 and profile data 302. Entities for which records are maintained within the entity table 308 may include individuals, corporate entities, organizations, objects, places, events, and so forth. Regardless of entity type, any entity regarding which the interaction server system 110 stores data may be a recognized entity. Each entity is provided with a unique identifier, as well as an entity type identifier (not shown).

The entity graph 310 stores information regarding relationships and associations between entities. Such relationships may be social, professional (e.g., work at a common corporation or organization), interest-based, or activity-based, merely for example.

The profile data 302 stores multiple types of profile data about a particular entity. The profile data 302 may be selectively used and presented to other users of the interaction system 100 based on privacy settings specified by a particular entity. Where the entity is an individual, the profile data 302 includes, for example, a user name, telephone number, address, settings (e.g., notification and privacy settings), as well as a user-selected avatar representation (or collection of such avatar representations). A particular user may then selectively include one or more of these avatar representations within the content of messages communicated via the interaction system 100, and on map interfaces displayed by interaction clients 104 to other users. The collection of avatar representations may include "status avatars," which present a graphical representation of a status or activity that the user may select to communicate at a particular time.

Where the entity is a group, the profile data 302 for the group may similarly include one or more avatar representations associated with the group, in addition to the group name, members, and various settings (e.g., notifications) for the relevant group. The database 304 also stores augmentation data, such as overlays or filters, in an augmentation table 312. The augmentation data is associated with and applied to videos (for which data is stored in a video table 314) and images (for which data is stored in an image table 316).

Filters, in some examples, are overlays that are displayed as overlaid on an image or video during presentation to a recipient user. Filters may be of various types, including user-selected filters from a set of filters presented to a sending user by the interaction client 104 when the sending user is composing a message. Other types of filters include geolocation filters (also known as geo-filters), which may be presented to a sending user based on geographic location. For example, geolocation filters specific to a neighborhood or special location may be presented within a user interface by the interaction client 104, based on geolocation information determined by a Global Positioning System (GPS) unit of the user system 102.

Another type of filter is a data filter, which may be selectively presented to a sending user by the interaction client 104 based on other inputs or information gathered by the user system 102 during the message creation process. Examples of data filters include current temperature at a specific location, a current speed at which a sending user is traveling, battery life for a user system 102, or the current time.

Other augmentation data that may be stored within the image table 316 includes augmented reality content items (e.g., corresponding to applying Lenses or augmented reality experiences). An augmented reality content item may be a real-time special effect and sound that may be added to an image or a video.

As described above, augmentation data includes augmented reality (AR), virtual reality (VR) and mixed reality (MR) content items, overlays, image transformations, images, and modifications that may be applied to image data (e.g., videos or images). This includes real-time modifications, which modify an image as it is captured using device sensors (e.g., one or multiple cameras) of the user system 102 and then displayed on a screen of the user system 102 with the modifications. This also includes modifications to stored content, such as video clips in a collection or group that may be modified. For example, in a user system 102 with access to multiple augmented reality content items, a user can use a single video clip with multiple augmented reality content items to see how the different augmented reality content items will modify the stored clip. Similarly, real-time video capture may use modifications to show how video images currently being captured by sensors of a user system 102 would modify the captured data. Such data may simply be displayed on the screen and not stored in memory, or the content captured by the device sensors may be recorded and stored in memory with or without the modifications (or both). In some systems, a preview feature can show how different augmented reality content items will look within different windows in a display at the same time. This can, for example, enable multiple windows with different pseudorandom animations to be viewed on a display at the same time.

Data and various systems using augmented reality content items or other such transform systems to modify content using this data can thus involve detection of objects (e.g., faces, hands, bodies, cats, dogs, surfaces, objects, etc.), tracking of such objects as they leave, enter, and move around the field of view in video frames, and the modification or transformation of such objects as they are tracked. In various examples, different methods for achieving such transformations may be used. Some examples may involve generating a three-dimensional mesh model of the object or objects, and using transformations and animated textures of the model within the video to achieve the transformation. In some examples, tracking of points on an object may be used to place an image or texture (which may be two-dimensional or three-dimensional) at the tracked position. In still further examples, neural network analysis of video frames may be used to place images, models, or textures in content (e.g., images or frames of video). Augmented reality content items thus refer both to the images, models, and textures used to create transformations in content, as well as to additional modeling and analysis information needed to achieve such transformations with object detection, tracking, and placement.

Real-time video processing can be performed with any kind of video data (e.g., video streams, video files, etc.) saved in a memory of a computerized system of any kind. For example, a user can load video files and save them in a memory of a device, or can generate a video stream using sensors of the device. Additionally, any objects can be processed using a computer animation model, such as a human's face and parts of a human body, animals, or non-living things such as chairs, cars, or other objects.

In some examples, when a particular modification is selected along with content to be transformed, elements to be transformed are identified by the computing device, and then detected and tracked if they are present in the frames of the video. The elements of the object are modified according to the request for modification, thus transforming the frames of the video stream. Transformation of frames of a video stream can be performed by different methods for different kinds of transformation. For example, for transformations of frames mostly referring to changing forms of an object's elements, characteristic points for each element of an object are calculated (e.g., using an Active Shape Model (ASM) or other known methods). Then, a mesh based on the characteristic points is generated for each element of the object. This mesh is used in the following stage of tracking the elements of the object in the video stream. In the process of tracking, the mesh for each element is aligned with a position of each element. Then, additional points are generated on the mesh.

In some examples, transformations changing some areas of an object using its elements can be performed by calculating characteristic points for each element of an object and generating a mesh based on the calculated characteristic points. Points are generated on the mesh, and then various areas based on the points are generated. The elements of the object are then tracked by aligning the area for each element with a position for each of the at least one element, and properties of the areas can be modified based on the request for modification, thus transforming the frames of the video stream. Depending on the specific request for modification, properties of the mentioned areas can be transformed in different ways. Such modifications may involve changing the color of areas; removing some part of areas from the frames of the video stream; including new objects into areas that are based on a request for modification; and modifying or distorting the elements of an area or object. In various examples, any combination of such modifications or other similar modifications may be used. For certain models to be animated, some characteristic points can be selected as control points to be used in determining the entire state-space of options for the model animation.

In some examples of a computer animation model to transform image data using face detection, the face is detected on an image using a specific face detection algorithm (e.g., Viola-Jones). Then, an Active Shape Model (ASM) algorithm is applied to the face region of an image to detect facial feature reference points.

Other methods and algorithms suitable for face detection can be used. For example, in some examples, features are located using a landmark, which represents a distinguishable point present in most of the images under consideration. For facial landmarks, for example, the location of the left eye pupil may be used. If an initial landmark is not identifiable (e.g., if a person has an eyepatch), secondary landmarks may be used. Such landmark identification procedures may be used for any such objects. In some examples, a set of landmarks forms a shape. Shapes can be represented as vectors using the coordinates of the points in the shape. One shape is aligned to another with a similarity transform (allowing translation, scaling, and rotation) that minimizes the average Euclidean distance between shape points. The mean shape is the mean of the aligned training shapes.

A transformation system can capture an image or video stream on a client device (e.g., the user system 102) and perform complex image manipulations locally on the user system 102 while maintaining a suitable user experience, computation time, and power consumption. The complex image manipulations may include size and shape changes, emotion transfers (e.g., changing a face from a frown to a smile), state transfers (e.g., aging a subject, reducing apparent age, changing gender), style transfers, graphical element application, and any other suitable image or video manipulation implemented by a convolutional neural network that has been configured to execute efficiently on the user system 102.

In some examples, a computer animation model to transform image data can be used by a system where a user may capture an image or video stream of the user (e.g., a selfie) using the user system 102 having a neural network operating as part of an interaction client 104 operating on the user system 102. The transformation system operating within the interaction client 104 determines the presence of a face within the image or video stream and provides modification icons associated with a computer animation model to transform image data, or the computer animation model can be present as associated with an interface described herein. The modification icons include changes that are the basis for modifying the user's face within the image or video stream as part of the modification operation. Once a modification icon is selected, the transform system initiates a process to convert the image of the user to reflect the selected modification icon (e.g., generate a smiling face on the user). A modified image or video stream may be presented in a graphical user interface displayed on the user system 102 as soon as the image or video stream is captured and a specified modification is selected. The transformation system may implement a complex convolutional neural network on a portion of the image or video stream to generate and apply the selected modification. That is, the user may capture the image or video stream and be presented with a modified result in real-time or near real-time once a modification icon has been selected. Further, the modification may be persistent while the video stream is being captured, and the selected modification icon remains toggled. Machine-taught neural networks may be used to enable such modifications.

The graphical user interface, presenting the modification performed by the transform system, may supply the user with additional interaction options. Such options may be based on the interface used to initiate the content capture and selection of a particular computer animation model (e.g., initiation from a content creator user interface). In various examples, a modification may be persistent after an initial selection of a modification icon. The user may toggle the modification on or off by tapping or otherwise selecting the face being modified by the transformation system and store it for later viewing or browsing to other areas of the imaging application. Where multiple faces are modified by the transformation system, the user may toggle the modification on or off globally by tapping or selecting a single face modified and displayed within a graphical user interface. In some examples, individual faces, among a group of multiple faces, may be individually modified, or such modifications may be individually toggled by tapping or selecting the individual face or a series of individual faces displayed within the graphical user interface.

A collection table 318 stores data regarding collections of messages and associated image, video, or audio data, which are compiled into a collection (e.g., a story or a gallery). The creation of a particular collection may be initiated by a particular user (e.g., each user for which a record is maintained in the entity table 308). A user may create a "personal story" in the form of a collection of content that has been created and sent/broadcast by that user. To this end, the user interface of the interaction client 104 may include an icon that is user-selectable to enable a sending user to add specific content to his or her personal story.

A collection may also constitute a "live story," which is a collection of content from multiple users that is created manually, automatically, or using a combination of manual and automatic techniques. For example, a "live story" may constitute a curated stream of user-submitted content from various locations and events. Users whose client devices have location services enabled and are at a common location event at a particular time may, for example, be presented with an option, via a user interface of the interaction client 104, to contribute content to a particular live story. The live story may be identified to the user by the interaction client 104, based on his or her location. The end result is a "live story" told from a community perspective.

A further type of content collection is known as a "location story," which enables a user whose user system 102 is located within a specific geographic location (e.g., on a college or university campus) to contribute to a particular collection. In some examples, a contribution to a location story may require a second degree of authentication to verify that the end-user belongs to a specific organization or other entity (e.g., is a student on the university campus).

As mentioned above, the video table 314 stores video data that, in some examples, is associated with messages for which records are maintained within the message table 306. Similarly, the image table 316 stores image data associated with messages for which message data is stored in the entity table 308. The entity table 308 may associate various augmentations from the augmentation table 312 with various images and videos stored in the image table 316 and the video table 314.

Figure 4:
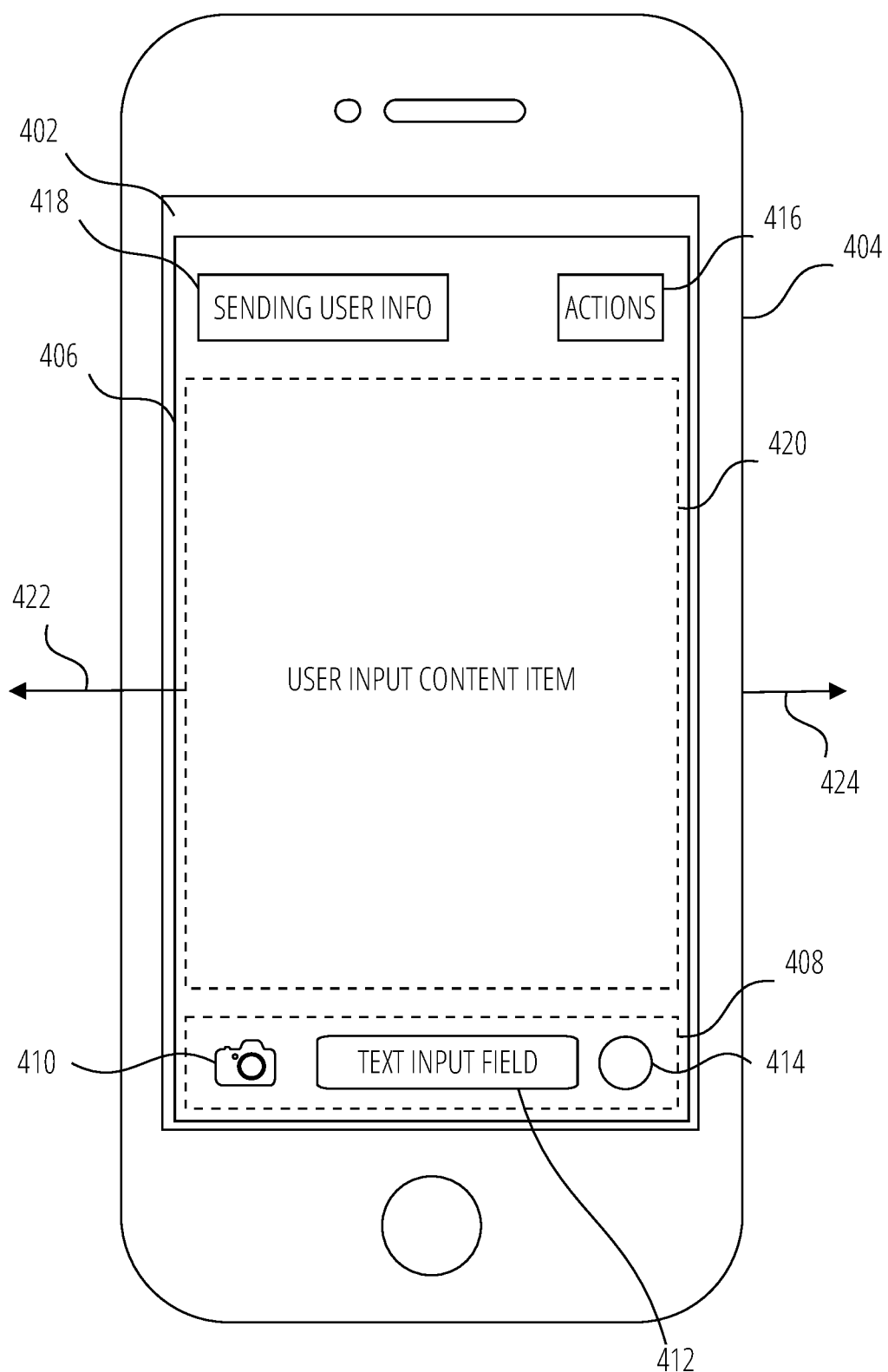
FIG. 4 is a user interface diagram illustrating a viewing interface, according to some examples.

FIG. 4 is a user interface diagram depicting a viewing interface 402, according to some examples, that may be presented by an interaction client 104 of an interaction application executing on a mobile device 404 (as an example of a user system 102). While the viewing interface 402 is described as being presented on the screen of the mobile device 404, the viewing interface 402 may also be presented using other types of devices that can provide suitable user interfaces, e.g., the optical display of a head-wearable apparatus 116, a desktop computer, smart contact lenses, or the like.

The viewing interface 402 displays a user input content item 406, which, in some examples, may be part of a collection of third-party content items generated and published (or posted) by a third-party user (sending user) of the interaction system 100. Such a collection may be referred to as a "story." The viewing user may navigate through the collection, e.g., by performing a suitable tapping gesture to move forward to a subsequent content item (see the arrow 424) or back to a previous content item (see the arrow 422) in the collection. In some examples, the collection may display each content item for a predefined time period before automatically proceeding to present the next content item in the collection. The user input content item 406 may comprise image data, video data, audio data, or a combination of these data types, together with augmentation or modification data (e.g., stickers, filters, or lenses).

The viewing interface 402 includes an interaction zone 408 in a lower region thereof, that includes a camera button 410 that is user-selectable to invoke a reply camera function. The reply camera function enables a user to respond to the publication or sharing of the user input content item 406 by a third-party user. This response may include a user-generated or user-selected content item (e.g., a digital image captured using the camera of the mobile device 404 via the reply camera function). To this end, user selection of the camera button 410 may cause the display of a camera user interface. The camera user interface may provide a continuous camera feed from a camera of the mobile device 404 together with a capture button, facilitating the capturing of image or video content. Additionally, the invoked reply camera function may enable the user to augment the captured or selected content item with an augmentation.

The interaction zone 408 further includes a text input field 412, into which a user can provide text to serve as or accompany a reply transmission to the third-party user, and a share button 414 that a user can select to share the user input content item 406, e.g., as a direct message to a third party user, to the viewing user's own "story," or to a third-party messaging application.

The camera button 410, the text input field 412, and the share button 414 may form part of a tray element that is displayed in the interaction zone 408, e.g., the interaction tray 704 shown in FIG. 7 and described below. In addition to the interaction zone 408, the viewing interface 402 includes an actions button 416 that is user-selectable to present, to the viewing user, a set of further available actions. These actions may, for example, include flagging the user input content item 406, muting the sending user, unfollowing the sending user, or the like.

Sending user information 418 may be included in the viewing interface 402, e.g., presented as overlaid on the user input content item 406. This information 418 may include a username and an avatar of the sending user, for example. The sending user information 418 may be user-selectable to cause display of a profile or content feed of the sending user.

Examples described herein enable a user to invoke a reply mechanism without having to utilize the interaction zone 408 or the actions button 416. For example, and as further described below, a viewing user may perform a gesture directed at the user input content item 406 within the viewing interface 402, e.g., a press and hold gesture in a gesture zone 420, to initiate a reply state transition that causes activation of the reply mechanism.

Figure 5:
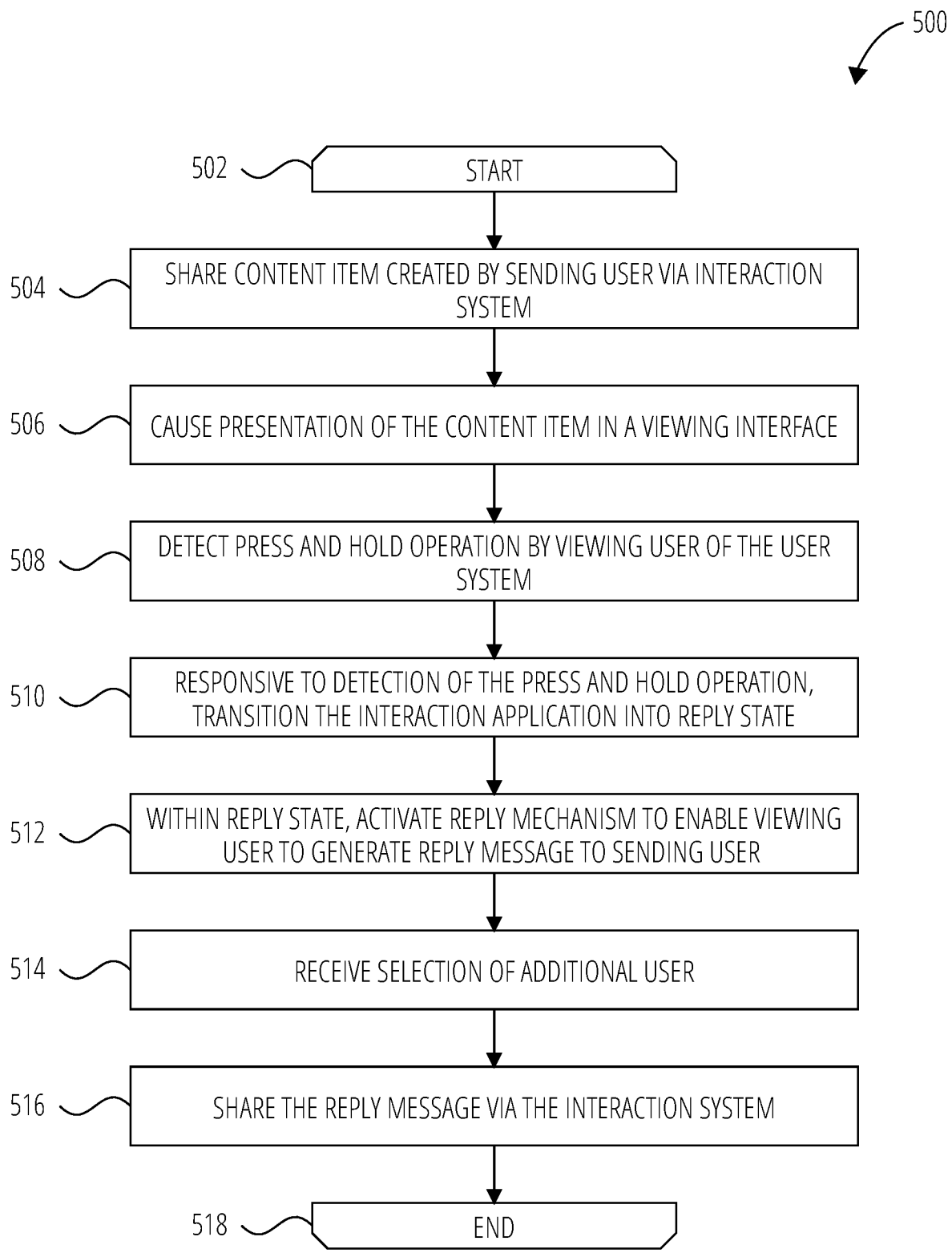
FIG. 5 is a flow diagram illustrating a method to facilitate communication between users of an interaction system, according to some examples.

FIG. 5 is a flowchart illustrating a method 500, according to some examples, to facilitate communication between users of an interaction system, e.g., the interaction system 100. The method 500 is described with reference to the user interfaces illustrated in FIG. 4 and FIG. 6 to FIG. 9. The method 500 is, in some examples, performed by components of the interaction system 100 described with reference to FIG. 1, such as the messaging system 210 or the collection management system 224.

The method 500 commences at opening loop element 502, and progresses to operation 504, where a sending user shares a user input content item via the interaction system 100, e.g., the user input content item 406. The user input content item 406 is presented within the viewing interface 402 (operation 506) as a result of the user input content item 406 having been shared by a sending user via the interaction system 100. For example, the sending user may generate, curate, and publish multiple user input content items in the form of a collection or narrative (e.g., an electronic "story") that is then made accessible to other users (e.g., including the viewing user) as a result of relationship data and associated access permissions stored within the entity table 308 and the entity graph 310. In some examples, the user input content item 406 may be presented within the viewing interface 402 as a result of selection, by the viewing user, of a message sender identifier 702 associated with the sending user in a preceding interface of the interaction client 104.

A particular user input content item (e.g., user input content item 406) is thus presented within the context of a viewing interface 402 of the interaction client 104 executing on a user system 102 (e.g., mobile device). The user input content item 406 may be a video clip, in which case the causing of the presentation may comprise executing a playback of the video clip within the viewing interface 402. The user input content item 406 may also be a still image, in which case the still image is displayed within the viewing interface. As mentioned, the user input content item may be part of a collection, in which case the item may be displayed for a predetermined period of time before the interaction client 104 transitions to presentation of a next content item in the collection.

Figure 6:
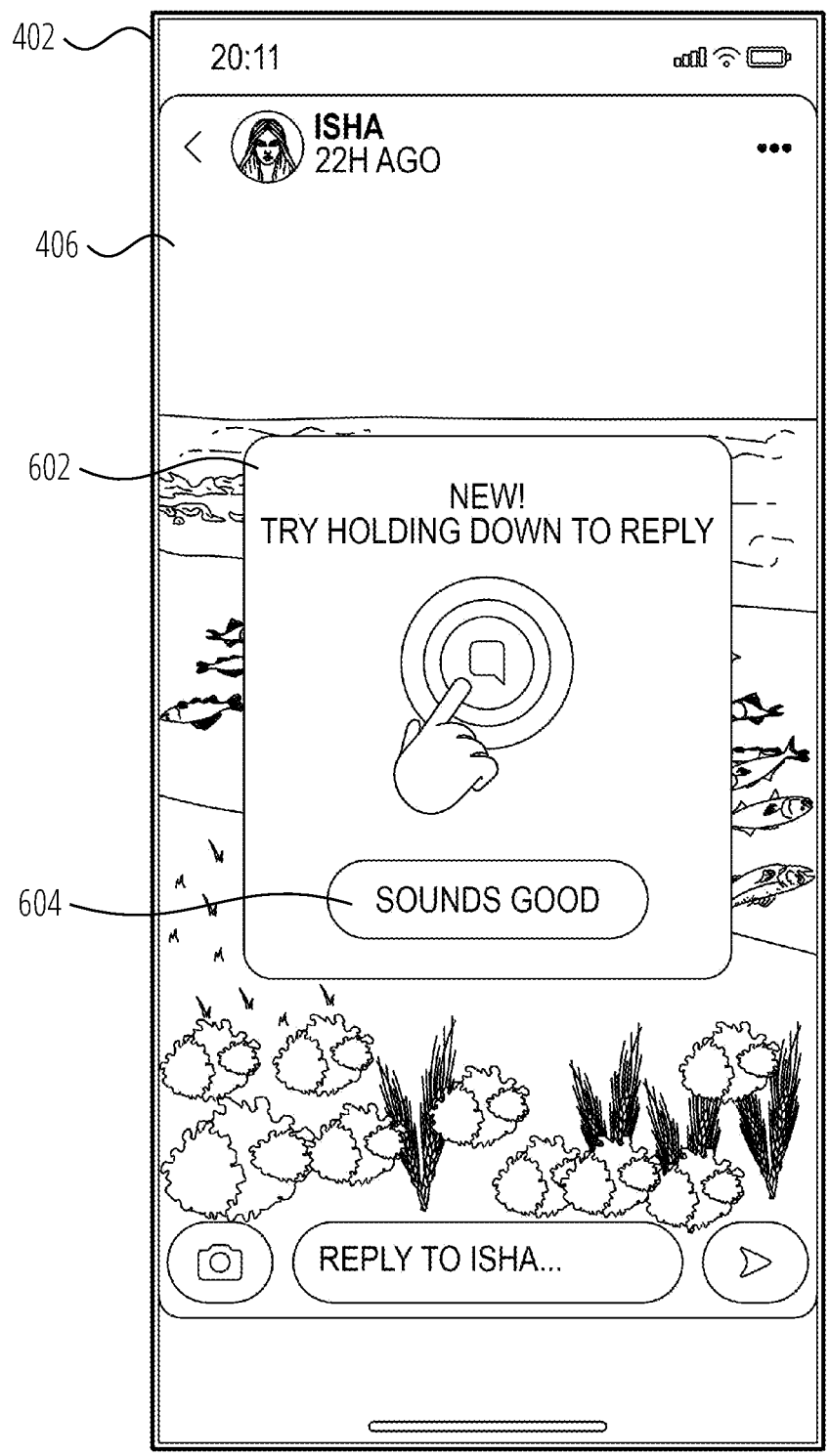
FIG. 6 is a user interface diagram illustrating a viewing interface, where a tooltip is overlaid on the viewing interface, according to some examples.

FIG. 6 shows the viewing interface 402 according to some examples. As shown in FIG. 6, in conjunction with the display of the user input content item 406 within the viewing interface 402, a tooltip in the example form of a notification card 602 is, in some examples, displayed overlaid on the user input content item 406. The notification card 602 is displayed by the interaction client 104 responsive to the user selection of the message sender identifier 702, and contains text and images notifying the viewing user of a reply function or reply mechanism that may be activated by the viewing user from within the context of the viewing interface 402, by performing a press and hold operation on the user input content item 406 displayed within the viewing interface 402. The viewing user may select an OK button 604 (presented with the text: "Sounds Good") to clear the notification card 602. The notification card 602 shown in FIG. 6 is merely an example, and other suitable tooltips, informational popovers, or the like, may be presented in other examples to provide a notification indicating that a specific operation or gesture causes activation of a reply mechanism.

Figure 7:
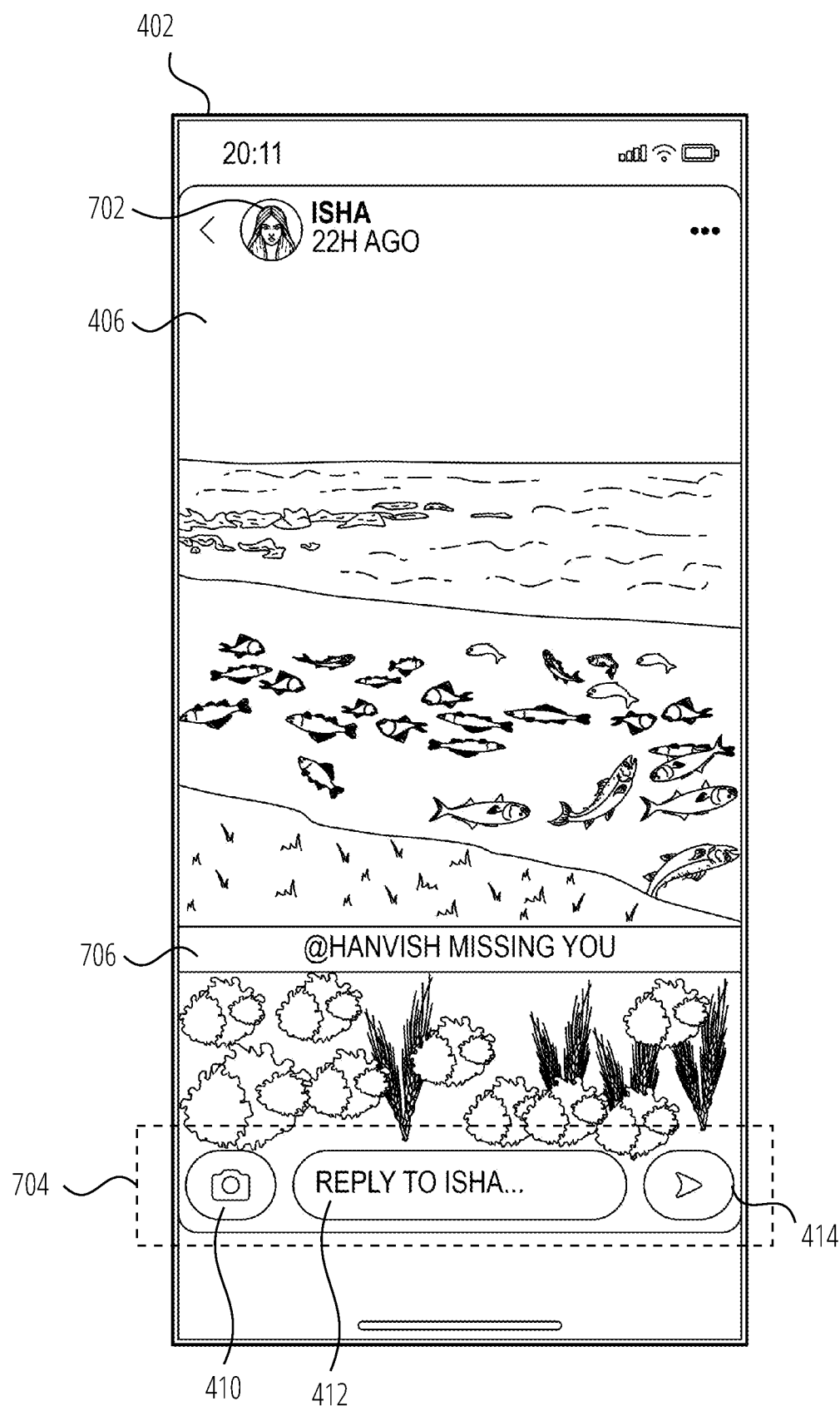
FIG. 7 is a user interface diagram illustrating a viewing interface in a view state, according to some examples.

FIG. 7 shows the viewing interface 402, according to some examples, after clearing of the notification card 602 by the viewing user. The viewing user is presented with the user input content item 406 published by the sending user (e.g., the user "Isha," as identified by the message sender identifier 702). The user input content item 406 is, in FIG. 7, part of a collection of content items created by the sending user.

In FIG. 7, the user input content item 406 is shown to include a still image captured by the sending user, with an augmentation 706 applied to the still image. The augmentation 706 is a media overlay comprising a rectangular bar with the following message: "@hanvish missing you." In the example of FIG. 7, the sending user ("Isha") thus tagged a further user (the user "Hanvish") of the interaction system 100 in the user input content item 406 by using the "@" symbol in the augmentation 706.

The viewing user may utilize the options in the interaction tray 704 to respond to or share the user input content item 406. Specifically, the viewing interface 402 includes the camera button 410 that is user-selectable to invoke a modular camera function of the interaction client 104 and to enable the viewing user to reply to the sending user with further user input content item in the form of image data. The viewing interface 402 further includes, as part of the interaction tray 704, the text input field 412 and the share button 414. Instead of using the interaction tray 704 to initiate a response, and as described below, the viewing user may perform a predefined gesture to cause transition to a reply state of the interaction application.

Returning to the method 500, at operation 508, the interaction client 104 detects a first operation, in the example form of a press and hold operation, by the viewing user of the user system 102 related to the presentation of the user input content item 406. The press and hold operation may comprise a press and hold gesture applied to the viewing interface 402 within which the user input content item 406 is presented. For example, the press and hold gesture, also referred to as a long press gesture, may be carried out when a touch input is held down for a longer duration than a normal tap, typically around 500 milliseconds or another predefined duration.

Figure 8:
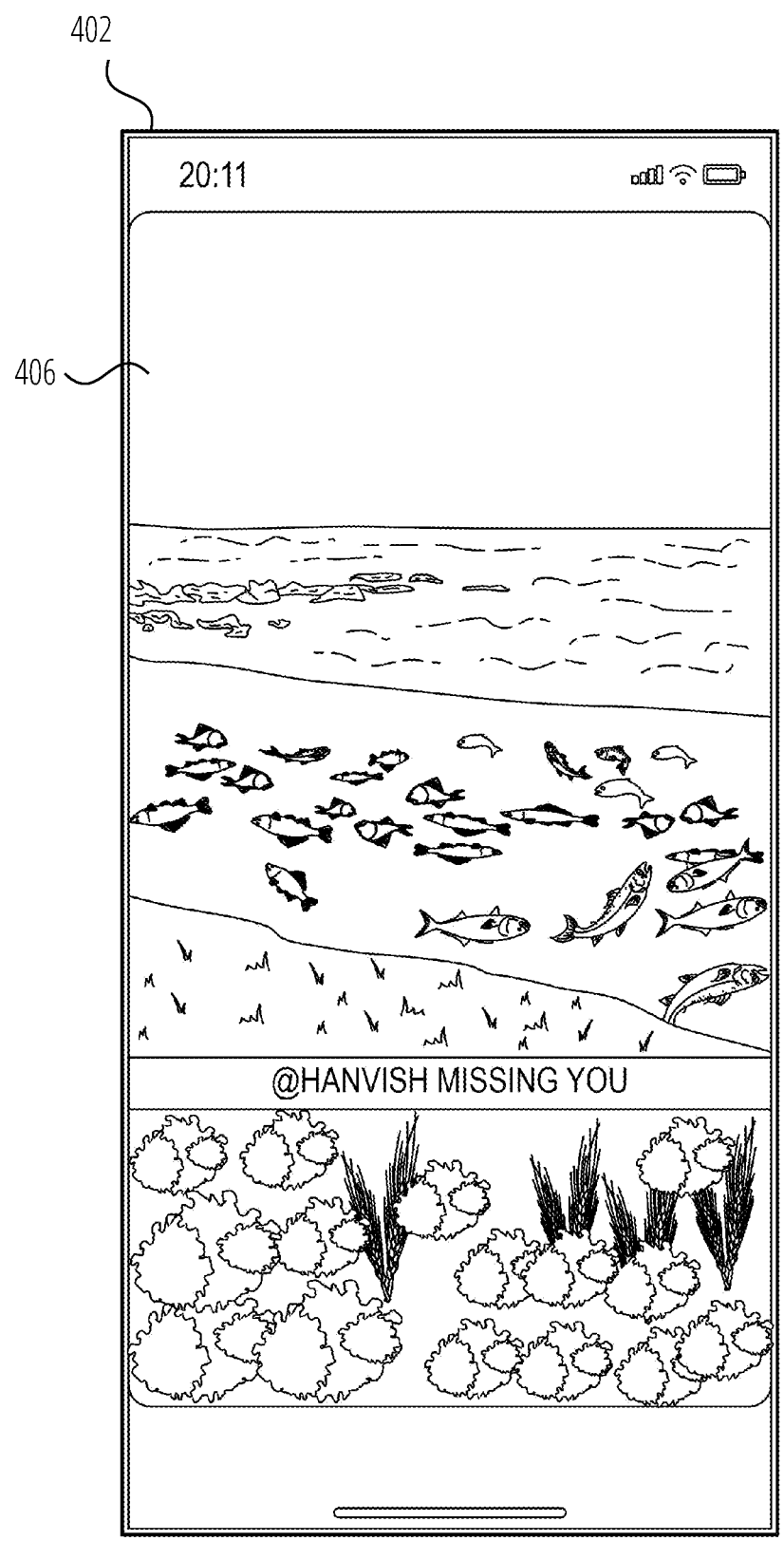
FIG. 8 is a user interface diagram illustrating a viewing interface in a paused state, according to some examples.

At operation 510, and responsive to the detection of the press and hold operation, the interaction client 104 transitions from a presentation state, or view state (as shown in FIG. 7), to a reply state. Where the user input content item 406 is a video clip, playback of the video clip within the viewing interface 402 is also paused responsive to the detection of the interaction client 104 transitioning to the reply state. Similarly, where the user input content item 406 is being presented in a time-based manner, e.g., for a predefined duration as part of a content collection (or any ephemeral message format), presentation may be paused such that the user input content item 406 remains presented in the viewing interface 402. As shown in FIG. 8, in some examples, the interaction system 100 may cause the interaction tray 704 to disappear from the viewing interface 402 as part of the pausing of the playback or presentation of the viewing interface 402. A paused state may thus be entered as an intermediate state, between the view state and the reply state, e.g., while the press and hold gesture is in progress.

Figure 9:
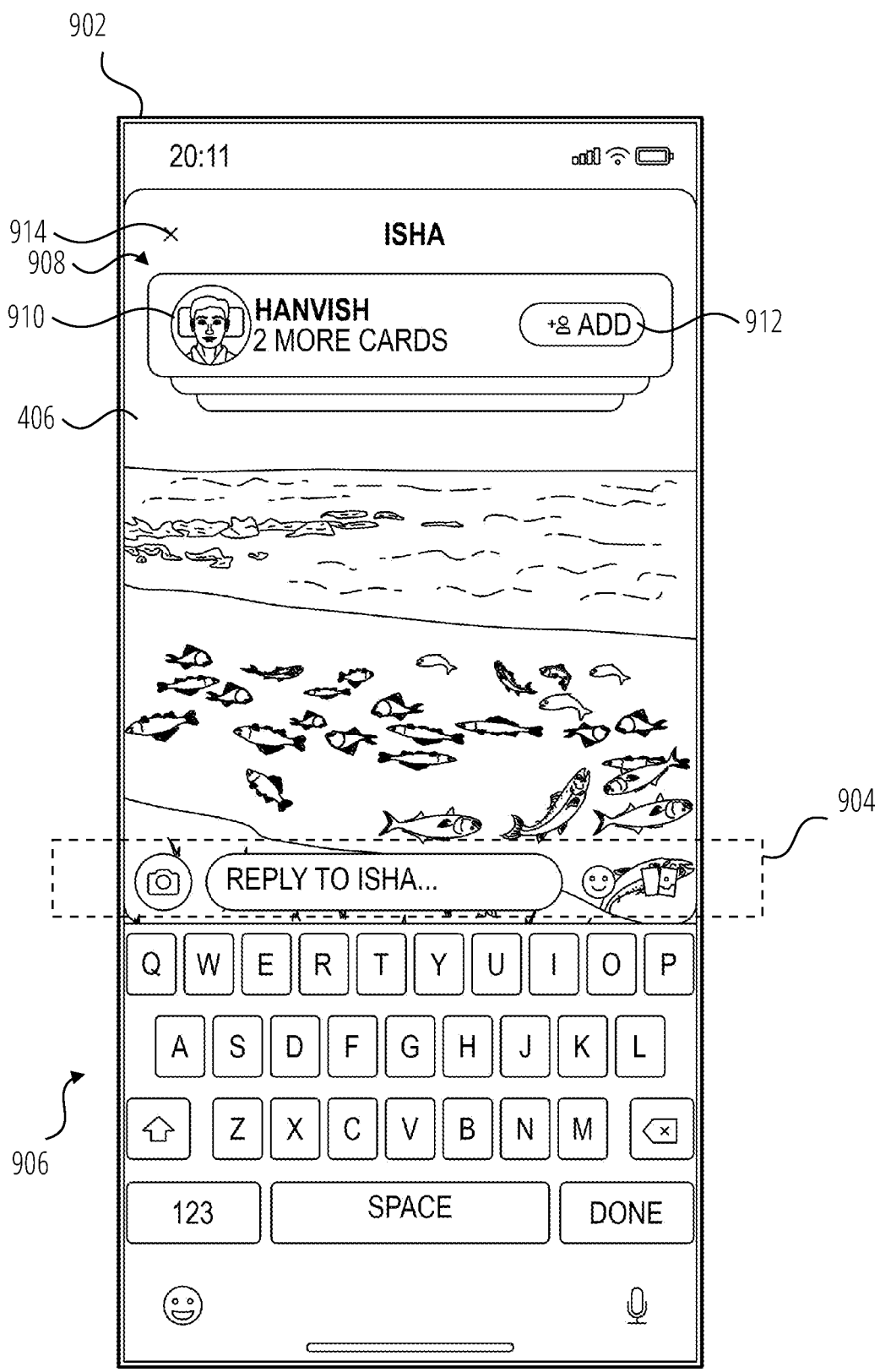
FIG. 9 is a user interface diagram illustrating a reply interface, according to some examples, provided in a reply state of an interaction application.

The reply state is illustrated in FIG. 9, according to some examples. At operation 512 of FIG. 5, and responsive to the entering of the reply state, the interaction client 104 activates a reply mechanism that enables the viewing user to reply to the sending user of the user input content item 406, for example, by commenting on the user input content item 406 or providing a further user input content item in response to the user input content item 406 of the sending user.

The reply mechanism includes a reply interface 902 that is shown in FIG. 9. The reply interface 902 comprises a plurality of interface components that are presented as overlaid on the viewing interface 402 such that the user input content item 406 is still partially visible within the reply interface 902. These interface components conveniently enable the viewing user to compose and formulate content for a reply message. A reply tray 904 is provided that includes various options for crafting a response (e.g., a camera button, a text input field, an emoji or icon selector, or a media library access button), as well as a touch keyboard 906 allowing the user to type a reply message. In some examples, the reply interface 902 is configured to generate or receive a further user input content item (e.g., a still image or video clip or text) for inclusion within the reply message and communication to the sending user. To this end, the reply interface provides and supports a camera function to enable the viewing user to capture image data as part of the further user input content item for communication to the sending user.

The reply message generated from the reply interface 902 may be a one-to-one message from the viewing user explicitly directed to the sending user, or may be a one-to-many transmission published by the interaction system 100 to multiple users of the interaction system based on relationships and associated permissions managed by the interaction system 100. To this end, and as shown in FIG. 9, upon entry of the interaction client 104 into the reply state and activation of the reply mechanism, a number of user addition graphical elements in the example form of user cards 908 may also be presented by the interaction client 104. The user cards 908 enable the viewing user to add further users of the interaction system 100 as recipients of the reply message, in addition to the sending user.

By selecting one or more user cards 908, the viewing user can conveniently add these additional recipients from within the same reply interface. Specifically, in FIG. 9, each user card 908 includes an identifier 910 of the further user, in the example form of a user name (e.g., the user "Hanvish") and profile image, as well as an add button 912. The add button 912 is user-selectable to address the reply message to the further user ("Hanvish") of the interaction system 100. At operation 514 of the method 500, the interaction system 100 may thus receive, from the viewing user, a selection of an additional user to add to the reply transmission.

In FIG. 9, the user cards 908 are shown in a stacked presentation. If the viewing user selects the top card from the stack of user cards 908 by selecting the add button 912, the relevant user ("Hanvish") is added to the reply message, the top card is removed, and a next card in the stack may be surfaced in the reply interface 902 for consideration by the viewing user. Alternatively, the user may perform a swiping gesture directed at the top card (e.g., swipe left or right) to remove the top card from the reply interface 902 (and thus not select the user associated with that card), also causing the next card to be surfaced by the interaction client 104.

The interaction client 104 may selectively present user cards 908 identifying other users of the interaction system 100 that also received, or had access to, the user input content item 406 as a result of having subscribed to the publication of the user input content item 406 from the sending user. In some examples, if another user was specifically tagged (or mentioned, or otherwise electronically identified) in the user input content item 406 (e.g., the identification of the user "Hanvish" by way of the augmentation 706), one of the user cards 908 may automatically be presented and populated with that user's details, as shown in FIG. 9. In this way, a group discussion regarding a particular user input content item 406 is facilitated.

In some examples, when the interaction client 104 is in the reply state (e.g., the state shown in FIG. 9), a viewing user can conveniently exit the reply state, and transition the interaction client 104 from the reply state back to the view state, by performing a second operation, in the example form of a swipe down operation. Alternatively, the viewing user can exit the reply state and return to the view state by selecting a cancel button 914 in the reply interface 902.

Figure 10:
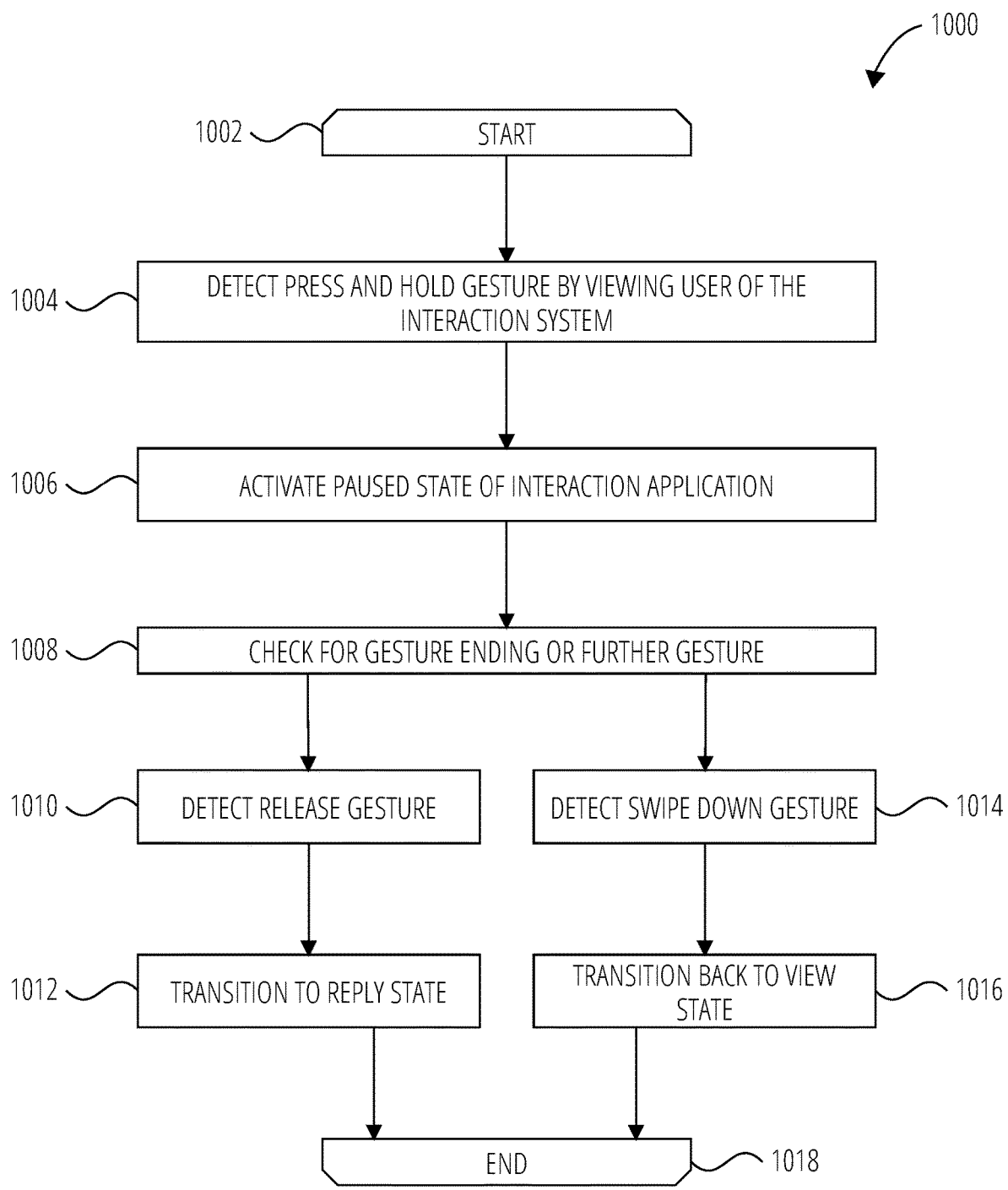
FIG. 10 is a flow diagram illustrating a method to facilitate communication between users of an interaction system, according to some examples.

In some examples, and as described with reference to FIG. 10 below, the interaction client 104 may enter a paused state prior to entering the reply state, and the user may be enabled to make a selection to transition from the paused state to the reply state or from the paused state back to the view state. In such examples, the second operation, e.g., the swipe down operation, may be made available to the viewing user in the paused state as opposed to the reply state.

Returning again to FIG. 5, at operation 516, the interaction client 104 receives or generates the further content item (e.g., an image or text) for inclusion within the reply message, and transmits the reply message to the sending user (and any other user selected from the user cards 908) via the interaction system 100. The method 500 then terminates at closing loop element 518.

As mentioned above, in some examples, the interaction client 104 may enter a paused state prior to entering the reply state, and the user may be enabled to make a selection to transition from the paused state to the reply state, or from the paused state back to the view state. To illustrate aspects thereof, FIG. 10 shows flowchart of a method 1000, according to some examples, to facilitate communication between users of an interaction system 100. The method 1000 is described with reference to the user interfaces illustrated in FIG. 4 and in FIG. 7 to FIG. 9. The method 1000 is, in some examples, performed by components of the interaction system 100 described with reference to FIG. 1.

The method 1000 commences at opening loop element 1002, and proceeds to operation 1004, where the interaction client 104 detects a press and hold gesture by a viewing user of the interaction system 100. As mentioned above, the press and hold gesture may be applied to a user input content item displayed within a viewing interface, e.g., the user input content item 406 as presented in the viewing interface 402 in FIG. 7.

In response to detecting that the press and hold gesture is in progress, at operation 1006, the interaction client 104 activates a paused state. A paused state may be presented to the user as shown in FIG. 8. As mentioned above, selectable interface elements such as the interaction tray 704 may be removed from the viewing interface 402 by the interaction client 104 while in the paused state. In some examples, the interaction client 104 remains in the paused state (with presentation of the user input content item 406 being paused or shown as "frozen") for as long as the press and hold gesture remains in progress (e.g., for as long as the user holds the press and hold gesture), and the interaction client 104 continuously checks (operation 1008) for ending of the press and hold gesture by the viewing user or a further gesture, as described below.

If the viewing user releases the press and hold gesture, e.g., by lifting a pressing finger from the display, the interaction system 100 detects the release gesture at operation 1010 and invokes the transition to the reply state (operation 1012). The reply state may be a state substantially as described above with reference to FIG. 9, including a reply interface and various reply components to facilitate communications between users of the interaction system 100.

However, the viewing user may wish to return to the view state instead of proceeding to the reply state. To this end, the viewing user may perform a predefined swiping gesture, such as a swipe down gesture, while the interaction client 104 is in the paused state (e.g., while the viewing user is still pressing and holding on the user input content item 406, and is presented with a view as shown in FIG. 8). In other words, instead of ending the press and hold gesture by simply releasing a finger or other input element (which would result in presentation of a reply interface), the viewing user may swipe down while still holding the original gesture to void the reply state transition. The interaction client 104 detects the swipe down gesture at operation 1014 and, in response to the detection of the swiping gesture, automatically transitions the interaction client 104 from the paused state back to the view state (e.g., the view state shown in FIG. 7) at operation 1016. The method 1000 concludes at closing loop element 1018.

Data Communications Architecture

Figure 11:
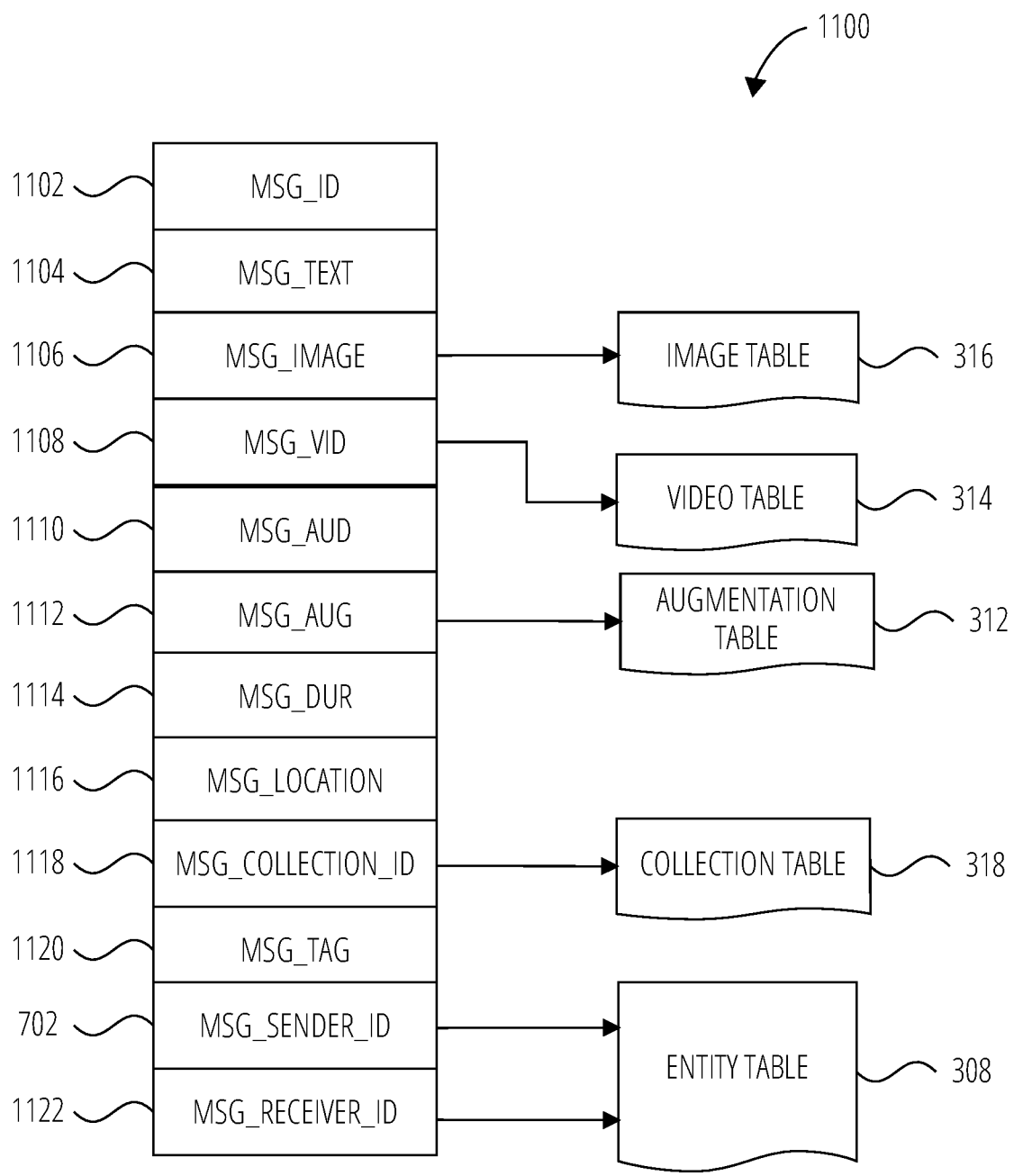
FIG. 11 is a diagrammatic representation of a message, according to some examples.

FIG. 11 is a schematic diagram illustrating a structure of a message 1100, according to some examples, generated by an interaction client 104 for communication to a further interaction client 104 via the interaction servers 124. The content of a particular message 1100 is used to populate the message table 306 stored within the database 304, accessible by the interaction servers 124. Similarly, the content of a message 1100 is stored in memory as "in-transit" or "in-flight" data of the user system 102 or the interaction servers 124. A message 1100 is shown to include the following example components:

- Message identifier 1102: a unique identifier that identifies the message 1100.
- Message text payload 1104: text, to be generated by a user via a user interface of the user system 102, and that is included in the message 1100.
- Message image payload 1106: image data, captured by a camera component of a user system 102 or retrieved from a memory component of a user system 102, and that is included in the message 1100. Image data for a sent or received message 1100 may be stored in the image table 316.
- Message video payload 1108: video data, captured by a camera component or retrieved from a memory component of the user system 102, and that is included in the message 1100. Video data for a sent or received message 1100 may be stored in the video table 314.
- Message audio payload 1110: audio data, captured by a microphone or retrieved from a memory component of the user system 102, and that is included in the message 1100.
- Message augmentation data 1112: augmentation data (e.g., filters, stickers, or other annotations or enhancements) that represents augmentations to be applied to message image payload 1106, message video payload 1108, or message audio payload 1110 of the message 1100. Augmentation data for a sent or received message 1100 may be stored in the augmentation table 312.
- Message duration parameter 1114: parameter value indicating, in seconds, the amount of time for which content of the message (e.g., the message image payload 1106, message video payload 1108, message audio payload 1110) is to be presented or made accessible to a user via the interaction client 104.
- Message geolocation parameter 1116: geolocation data (e.g., latitudinal and longitudinal coordinates) associated with the content payload of the message. Multiple message geolocation parameter 1116 values may be included in the payload, each of these parameter values being associated with respect to content items included in the content (e.g., a specific image within the message image payload 1106, or a specific video in the message video payload 1108).
- Message collection identifier 1118: identifier values identifying one or more content collections (e.g., "stories" identified in the collection table 318) with which a particular content item in the message image payload 1106 of the message 1100 is associated. For example, multiple images within the message image payload 1106 may each be associated with multiple content collections using identifier values.
- Message tag 1120: each message 1100 may be tagged with multiple tags, each of which is indicative of the subject matter of content included in the message payload. For example, where a particular image included in the message image payload 1106 depicts an animal (e.g., a lion), a tag value may be included within the message tag 1120 that is indicative of the relevant animal. Tag values may be generated manually, based on user input, or may be automatically generated using, for example, image recognition.
- Message sender identifier 702: an identifier (e.g., a messaging system identifier, email address, or device identifier) indicative of a user of the user system 102 on which the message 1100 was generated and from which the message 1100 was sent.
- Message receiver identifier 1122: an identifier (e.g., a messaging system identifier, email address, or device identifier) indicative of a user of the user system 102 to which the message 1100 is addressed.

The contents (e.g., values) of the various components of message 1100 may be pointers to locations in tables within which content data values are stored. For example, an image value in the message image payload 1106 may be a pointer to (or address of) a location within an image table 316. Similarly, values within the message video payload 1108 may point to data stored within a video table 314, values stored within the message augmentation data may point to data stored in an augmentation table 312, values stored within the message collection identifier 1118 may point to data stored in a collection table 318, and values stored within the message sender identifier 702 and the message receiver identifier 1122 may point to user records stored within an entity table 308.

System with Head-Wearable Apparatus

Figure 12:
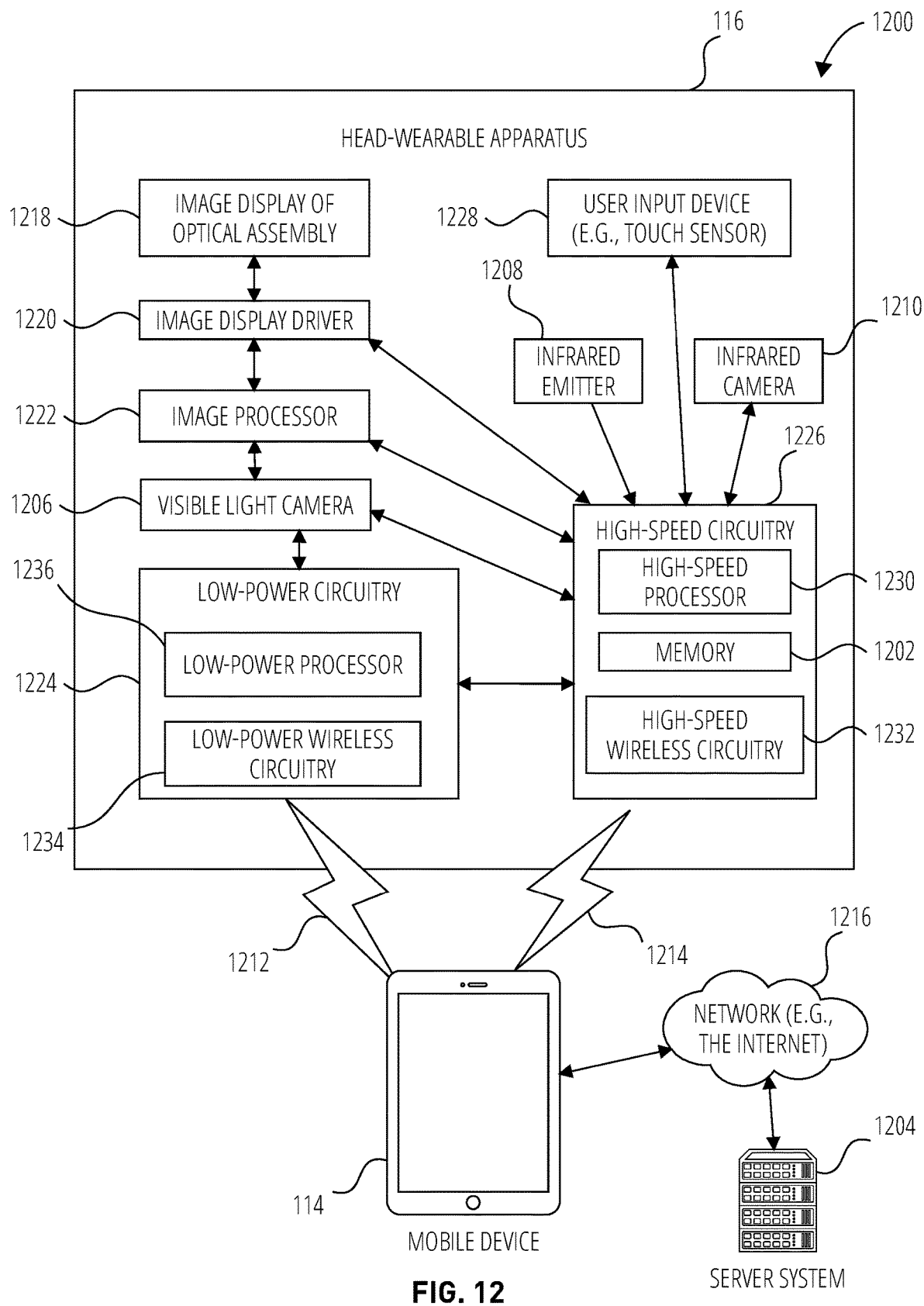
FIG. 12 illustrates a system including a head-wearable apparatus, according to some examples.

FIG. 12 illustrates a system 1200 including a head-wearable apparatus 116 with a selector input device, according to some examples. FIG. 12 is a high-level functional block diagram of an example head-wearable apparatus 116 communicatively coupled to a mobile device 114 and various server systems 1204 (e.g., the interaction server system 110) via various networks 1216.

The head-wearable apparatus 116 includes one or more cameras, each of which may be, for example, a visible light camera 1206, an infrared emitter 1208, and an infrared camera 1210. The mobile device 114 connects with head-wearable apparatus 116 using both a low-power wireless connection 1212 and a high-speed wireless connection 1214. The mobile device 114 is also connected to the server system 1204 and the network 1216.

The head-wearable apparatus 116 further includes two image displays of the image display of optical assembly 1218. The two image displays of optical assembly 1218 include one associated with the left lateral side and one associated with the right lateral side of the head-wearable apparatus 116. The head-wearable apparatus 116 also includes an image display driver 1220, an image processor 1222, low-power circuitry 1224, and high-speed circuitry 1226. The image display of optical assembly 1218 is for presenting images and videos, including an image that can include a graphical user interface to a user of the head-wearable apparatus 116.

The image display driver 1220 commands and controls the image display of optical assembly 1218. The image display driver 1220 may deliver image data directly to the image display of optical assembly 1218 for presentation or may convert the image data into a signal or data format suitable for delivery to the image display device. For example, the image data may be video data formatted according to compression formats, such as H.264 (MPEG-4 Part 10), HEVC, Theora, Dirac, RealVideo RV40, VP8, VP9, or the like, and still image data may be formatted according to compression formats such as Portable Network Group (PNG), Joint Photographic Experts Group (JPEG), Tagged Image File Format (TIFF) or exchangeable image file format (EXIF) or the like.

The head-wearable apparatus 116 includes a frame and stems (or temples) extending from a lateral side of the frame. The head-wearable apparatus 116 further includes a user input device 1228 (e.g., touch sensor or push button), including an input surface on the head-wearable apparatus 116. The user input device 1228 (e.g., touch sensor or push button) is to receive from the user an input selection to manipulate the graphical user interface of the presented image.

The components shown in FIG. 12 for the head-wearable apparatus 116 are located on one or more circuit boards, for example a PCB or flexible PCB, in the rims or temples. Alternatively, or additionally, the depicted components can be located in the chunks, frames, hinges, or bridge of the head-wearable apparatus 116. Left and right visible light cameras 1206 can include digital camera elements such as a complementary metal oxide-semiconductor (CMOS) image sensor, charge-coupled device, camera lenses, or any other respective visible or light-capturing elements that may be used to capture data, including images of scenes with unknown objects.

The head-wearable apparatus 116 includes a memory 1202, which stores instructions to perform a subset or all of the functions described herein. The memory 1202 can also include a storage device.

As shown in FIG. 12, the high-speed circuitry 1226 includes a high-speed processor 1230, a memory 1202, and high-speed wireless circuitry 1232. In some examples, the image display driver 1220 is coupled to the high-speed circuitry 1226 and operated by the high-speed processor 1230 in order to drive the left and right image displays of the image display of optical assembly 1218. The high-speed processor 1230 may be any processor capable of managing high-speed communications and operation of any general computing system needed for the head-wearable apparatus 116. The high-speed processor 1230 includes processing resources needed for managing high-speed data transfers on a high-speed wireless connection 1214 to a wireless local area network (WLAN) using the high-speed wireless circuitry 1232. In certain examples, the high-speed processor 1230 executes an operating system such as a LINUX operating system or other such operating system of the head-wearable apparatus 116, and the operating system is stored in the memory 1202 for execution. In addition to any other responsibilities, the high-speed processor 1230 executing a software architecture for the head-wearable apparatus 116 is used to manage data transfers with high-speed wireless circuitry 1232. In certain examples, the high-speed wireless circuitry 1232 is configured to implement Institute of Electrical and Electronic Engineers (IEEE) 802.11 communication standards, also referred to herein as WiFi. In some examples, other high-speed communications standards may be implemented by the high-speed wireless circuitry 1232.

The low-power wireless circuitry 1234 and the high-speed wireless circuitry 1232 of the head-wearable apparatus 116 can include short-range transceivers (Bluetooth™) and wireless wide, local, or wide area network transceivers (e.g., cellular or WiFi). Mobile device 114, including the transceivers communicating via the low-power wireless connection 1212 and the high-speed wireless connection 1214, may be implemented using details of the architecture of the head-wearable apparatus 116, as can other elements of the network 1216.

The memory 1202 includes any storage device capable of storing various data and applications, including, among other things, camera data generated by the left and right visible light cameras 1206, the infrared camera 1210, and the image processor 1222, as well as images generated for display by the image display driver 1220 on the image displays of the image display of optical assembly 1218. While the memory 1202 is shown as integrated with high-speed circuitry 1226, in some examples, the memory 1202 may be an independent standalone element of the head-wearable apparatus 116. In certain such examples, electrical routing lines may provide a connection through a chip that includes the high-speed processor 1230 from the image processor 1222 or the low-power processor 1236 to the memory 1202. In some examples, the high-speed processor 1230 may manage addressing of the memory 1202 such that the low-power processor 1236 will boot the high-speed processor 1230 any time that a read or write operation involving memory 1202 is needed.

As shown in FIG. 12, the low-power processor 1236 or high-speed processor 1230 of the head-wearable apparatus 116 can be coupled to the camera (visible light camera 1206, infrared emitter 1208, or infrared camera 1210), the image display driver 1220, the user input device 1228 (e.g., touch sensor or push button), and the memory 1202.

The head-wearable apparatus 116 is connected to a host computer. For example, the head-wearable apparatus 116 is paired with the mobile device 114 via the high-speed wireless connection 1214 or connected to the server system 1204 via the network 1216. The server system 1204 may be one or more computing devices as part of a service or network computing system, for example, that includes a processor, a memory, and network communication interface to communicate over the network 1216 with the mobile device 114 and the head-wearable apparatus 116.

The mobile device 114 includes a processor and a network communication interface coupled to the processor. The network communication interface allows for communication over the network 1216, low-power wireless connection 1212, or high-speed wireless connection 1214. Mobile device 114 can further store at least portions of the instructions for generating binaural audio content in the mobile device 114's memory to implement the functionality described herein.

Output components of the head-wearable apparatus 116 include visual components, such as a display such as a liquid crystal display (LCD), a plasma display panel (PDP), a light-emitting diode (LED) display, a projector, or a waveguide. The image displays of the optical assembly are driven by the image display driver 1220. The output components of the head-wearable apparatus 116 further include acoustic components (e.g., speakers), haptic components (e.g., a vibratory motor), other signal generators, and so forth. The input components of the head-wearable apparatus 116, the mobile device 114, and server system 1204, such as the user input device 1228, may include alphanumeric input components (e.g., a keyboard, a touch screen configured to receive alphanumeric input, a photo-optical keyboard, or other alphanumeric input components), point-based input components (e.g., a mouse, a touchpad, a trackball, a joystick, a motion sensor, or other pointing instruments), tactile input components (e.g., a physical button, a touch screen that provides location and force of touches or touch gestures, or other tactile input components), audio input components (e.g., a microphone), and the like.

The head-wearable apparatus 116 may also include additional peripheral device elements. Such peripheral device elements may include biometric sensors, additional sensors, or display elements integrated with the head-wearable apparatus 116. For example, peripheral device elements may include any I/O components including output components, motion components, position components, or any other such elements described herein.

For example, the biometric components include components to detect expressions (e.g., hand expressions, facial expressions, vocal expressions, body gestures, or eye-tracking), measure biosignals (e.g., blood pressure, heart rate, body temperature, perspiration, or brain waves), identify a person (e.g., voice identification, retinal identification, facial identification, fingerprint identification, or electroencephalogram based identification), and the like. The motion components include acceleration sensor components (e.g., accelerometer), gravitation sensor components, rotation sensor components (e.g., gyroscope), and so forth. The position components include location sensor components to generate location coordinates (e.g., a Global Positioning System (GPS) receiver component), Wi-Fi or Bluetooth™ transceivers to generate positioning system coordinates, altitude sensor components (e.g., altimeters or barometers that detect air pressure from which altitude may be derived), orientation sensor components (e.g., magnetometers), and the like. Such positioning system coordinates can also be received over low-power wireless connections 1212 and high-speed wireless connection 1214 from the mobile device 114 via the low-power wireless circuitry 1234 or high-speed wireless circuitry 1232.

Any biometric data collected by biometric components is captured and stored with only user approval and deleted on user request. Further, such biometric data may be used for very limited purposes, such as identification verification. To ensure limited and authorized use of biometric information and other personally identifiable information (PII), access to this data is restricted to authorized personnel only, if at all. Any use of biometric data may strictly be limited to identification verification purposes, and the biometric data is not shared or sold to any third party without the explicit consent of the user. In addition, appropriate technical and organizational measures are implemented to ensure the security and confidentiality of this sensitive information.

Machine Architecture

Figure 13:
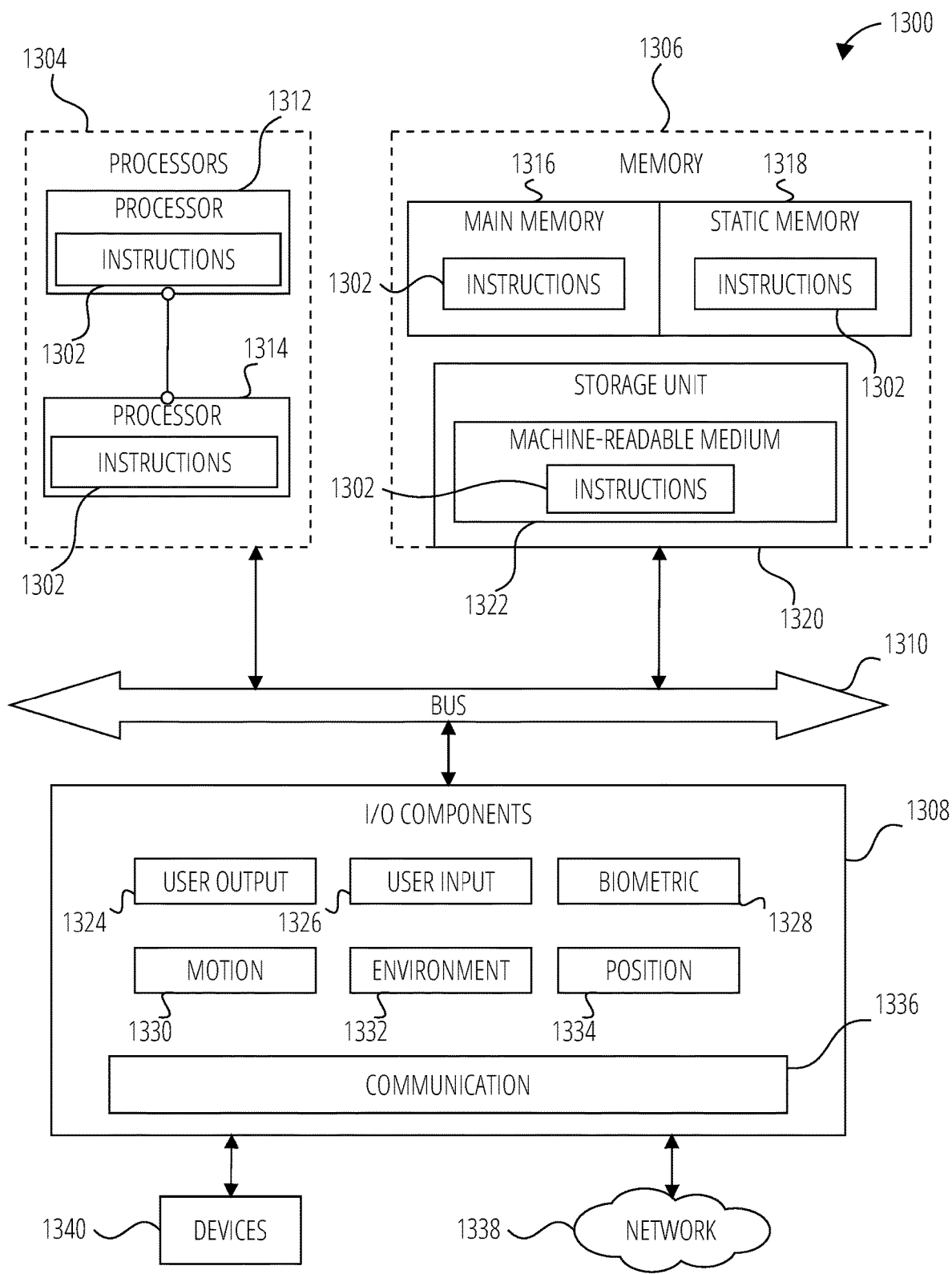
FIG. 13 is a diagrammatic representation of a machine in the form of a computer system within which a set of instructions may be executed to cause the machine to perform any one or more of the methodologies discussed herein, according to some examples.

FIG. 13 is a diagrammatic representation of a machine 1300 within which instructions 1302 (e.g., software, a program, an application, an applet, an app, or other executable code) for causing the machine 1300 to perform any one or more of the methodologies discussed herein may be executed. For example, the instructions 1302 may cause the machine 1300 to execute any one or more of the methods described herein. The instructions 1302 transform the general, non-programmed machine 1300 into a particular machine 1300 programmed to carry out the described and illustrated functions in the manner described. The machine 1300 may operate as a standalone device or may be coupled (e.g., networked) to other machines. In a networked deployment, the machine 1300 may operate in the capacity of a server machine or a client machine in a server-client network environment, or as a peer machine in a peer-to-peer (or distributed) network environment. The machine 1300 may comprise, but not be limited to, a server computer, a client computer, a personal computer (PC), a tablet computer, a laptop computer, a netbook, a set-top box (STB), a personal digital assistant (PDA), an entertainment media system, a cellular telephone, a smartphone, a mobile device, a wearable device (e.g., a smartwatch), a smart home device (e.g., a smart appliance), other smart devices, a web appliance, a network router, a network switch, a network bridge, or any machine capable of executing the instructions 1302, sequentially or otherwise, that specify actions to be taken by the machine 1300. Further, while a single machine 1300 is illustrated, the term "machine" shall also be taken to include a collection of machines that individually or jointly execute the instructions 1302 to perform any one or more of the methodologies discussed herein. The machine 1300, for example, may comprise the user system 102 or any one of multiple server devices forming part of the interaction server system 110. In some examples, the machine 1300 may also comprise both client and server systems, with certain operations of a particular method or algorithm being performed on the server-side and with certain operations of the particular method or algorithm being performed on the client-side.

The machine 1300 may include processors 1304, memory 1306, and input/output I/O components 1308, which may be configured to communicate with each other via a bus 1310. In an example, the processors 1304 (e.g., a Central Processing Unit (CPU), a Reduced Instruction Set Computing (RISC) Processor, a Complex Instruction Set Computing (CISC) Processor, a Graphics Processing Unit (GPU), a Digital Signal Processor (DSP), an Application Specific Integrated Circuit (ASIC), a Radio-Frequency Integrated Circuit (RFIC), another processor, or any suitable combination thereof) may include, for example, a processor 1312 and a processor 1314 that execute the instructions 1302. The term "processor" is intended to include multi-core processors that may comprise two or more independent processors (sometimes referred to as "cores") that may execute instructions contemporaneously. Although FIG. 13 shows multiple processors 1304, the machine 1300 may include a single processor with a single-core, a single processor with multiple cores (e.g., a multi-core processor), multiple processors with a single core, multiple processors with multiples cores, or any combination thereof.

The memory 1306 includes a main memory 1316, a static memory 1318, and a storage unit 1320, both accessible to the processors 1304 via the bus 1310. The main memory 1306, the static memory 1318, and storage unit 1320 store the instructions 1302 embodying any one or more of the methodologies or functions described herein. The instructions 1302 may also reside, completely or partially, within the main memory 1316, within the static memory 1318, within machine-readable medium 1322 within the storage unit 1320, within at least one of the processors 1304 (e.g., within the processor's cache memory), or any suitable combination thereof, during execution thereof by the machine 1300.

The I/O components 1308 may include a wide variety of components to receive input, provide output, produce output, transmit information, exchange information, capture measurements, and so on. The specific I/O components 1308 that are included in a particular machine will depend on the type of machine. For example, portable machines such as mobile phones may include a touch input device or other such input mechanisms, while a headless server machine will likely not include such a touch input device. It will be appreciated that the I/O components 1308 may include many other components that are not shown in FIG. 13. In various examples, the I/O components 1308 may include user output components 1324 and user input components 1326. The user output components 1324 may include visual components (e.g., a display such as a plasma display panel (PDP), a light-emitting diode (LED) display, a liquid crystal display (LCD), a projector, or a cathode ray tube (CRT)), acoustic components (e.g., speakers), haptic components (e.g., a vibratory motor, resistance mechanisms), other signal generators, and so forth. The user input components 1326 may include alphanumeric input components (e.g., a keyboard, a touch screen configured to receive alphanumeric input, a photo-optical keyboard, or other alphanumeric input components), point-based input components (e.g., a mouse, a touchpad, a trackball, a joystick, a motion sensor, or another pointing instrument), tactile input components (e.g., a physical button, a touch screen that provides location and force of touches or touch gestures, or other tactile input components), audio input components (e.g., a microphone), and the like.

In further examples, the I/O components 1308 may include biometric components 1328, motion components 1330, environmental components 1332, or position components 1334, among a wide array of other components. For example, the biometric components 1328 include components to detect expressions (e.g., hand expressions, facial expressions, vocal expressions, body gestures, or eye-tracking), measure biosignals (e.g., blood pressure, heart rate, body temperature, perspiration, or brain waves), identify a person (e.g., voice identification, retinal identification, facial identification, fingerprint identification, or electroencephalogram-based identification), and the like. The motion components 1330 include acceleration sensor components (e.g., accelerometer), gravitation sensor components, rotation sensor components (e.g., gyroscope).

The environmental components 1332 include, for example, one or cameras (with still image/photograph and video capabilities), illumination sensor components (e.g., photometer), temperature sensor components (e.g., one or more thermometers that detect ambient temperature), humidity sensor components, pressure sensor components (e.g., barometer), acoustic sensor components (e.g., one or more microphones that detect background noise), proximity sensor components (e.g., infrared sensors that detect nearby objects), gas sensors (e.g., gas detection sensors to detection concentrations of hazardous gases for safety or to measure pollutants in the atmosphere), or other components that may provide indications, measurements, or signals corresponding to a surrounding physical environment.

With respect to cameras, the user system 102 may have a camera system comprising, for example, front cameras on a front surface of the user system 102 and rear cameras on a rear surface of the user system 102. The front cameras may, for example, be used to capture still images and video of a user of the user system 102 (e.g., "selfies"), which may then be augmented with augmentation data (e.g., filters) described above. The rear cameras may, for example, be used to capture still images and videos in a more traditional camera mode, with these images similarly being augmented with augmentation data. In addition to front and rear cameras, the user system 102 may also include a 360° camera for capturing 360° photographs and videos.

Further, the camera system of the user system 102 may include dual rear cameras (e.g., a primary camera as well as a depth-sensing camera), or even triple, quad or penta rear camera configurations on the front and rear sides of the user system 102. These multiple camera systems may include a wide camera, an ultra-wide camera, a telephoto camera, a macro camera, and a depth sensor, for example.

The position components 1334 include location sensor components (e.g., a GPS receiver component), altitude sensor components (e.g., altimeters or barometers that detect air pressure from which altitude may be derived), orientation sensor components (e.g., magnetometers), and the like.

Communication may be implemented using a wide variety of technologies. The I/O components 1308 further include communication components 1336 operable to couple the machine 1300 to a network 1338 or devices 1340 via respective coupling or connections. For example, the communication components 1336 may include a network interface component or another suitable device to interface with the network 1338. In further examples, the communication components 1336 may include wired communication components, wireless communication components, cellular communication components, Near Field Communication (NFC) components, Bluetooth® components (e.g., Bluetooth® Low Energy), Wi-Fi® components, and other communication components to provide communication via other modalities. The devices 1340 may be another machine or any of a wide variety of peripheral devices (e.g., a peripheral device coupled via a USB).

Moreover, the communication components 1336 may detect identifiers or include components operable to detect identifiers. For example, the communication components 1336 may include Radio Frequency Identification (RFID) tag reader components, NFC smart tag detection components, optical reader components (e.g., an optical sensor to detect one-dimensional bar codes such as Universal Product Code (UPC) bar code, multi-dimensional bar codes such as Quick Response (QR) code, Aztec code, Data Matrix, Dataglyph, MaxiCode, PDF417, Ultra Code, UCC RSS-2D bar code, and other optical codes), or acoustic detection components (e.g., microphones to identify tagged audio signals). In addition, a variety of information may be derived via the communication components 1336, such as location via Internet Protocol (IP) geolocation, location via Wi-Fi® signal triangulation, location via detecting an NFC beacon signal that may indicate a particular location, and so forth.

The various memories (e.g., main memory 1316, static memory 1318, and memory of the processors 1304) and storage unit 1320 may store one or more sets of instructions and data structures (e.g., software) embodying or used by any one or more of the methodologies or functions described herein. These instructions (e.g., the instructions 1302), when executed by processors 1304, cause various operations to implement the disclosed examples.

The instructions 1302 may be transmitted or received over the network 1338, using a transmission medium, via a network interface device (e.g., a network interface component included in the communication components 1336) and using any one of several well-known transfer protocols (e.g., hypertext transfer protocol (HTTP)). Similarly, the instructions 1302 may be transmitted or received using a transmission medium via a coupling (e.g., a peer-to-peer coupling) to the devices 1340.

Software Architecture

Figure 14:
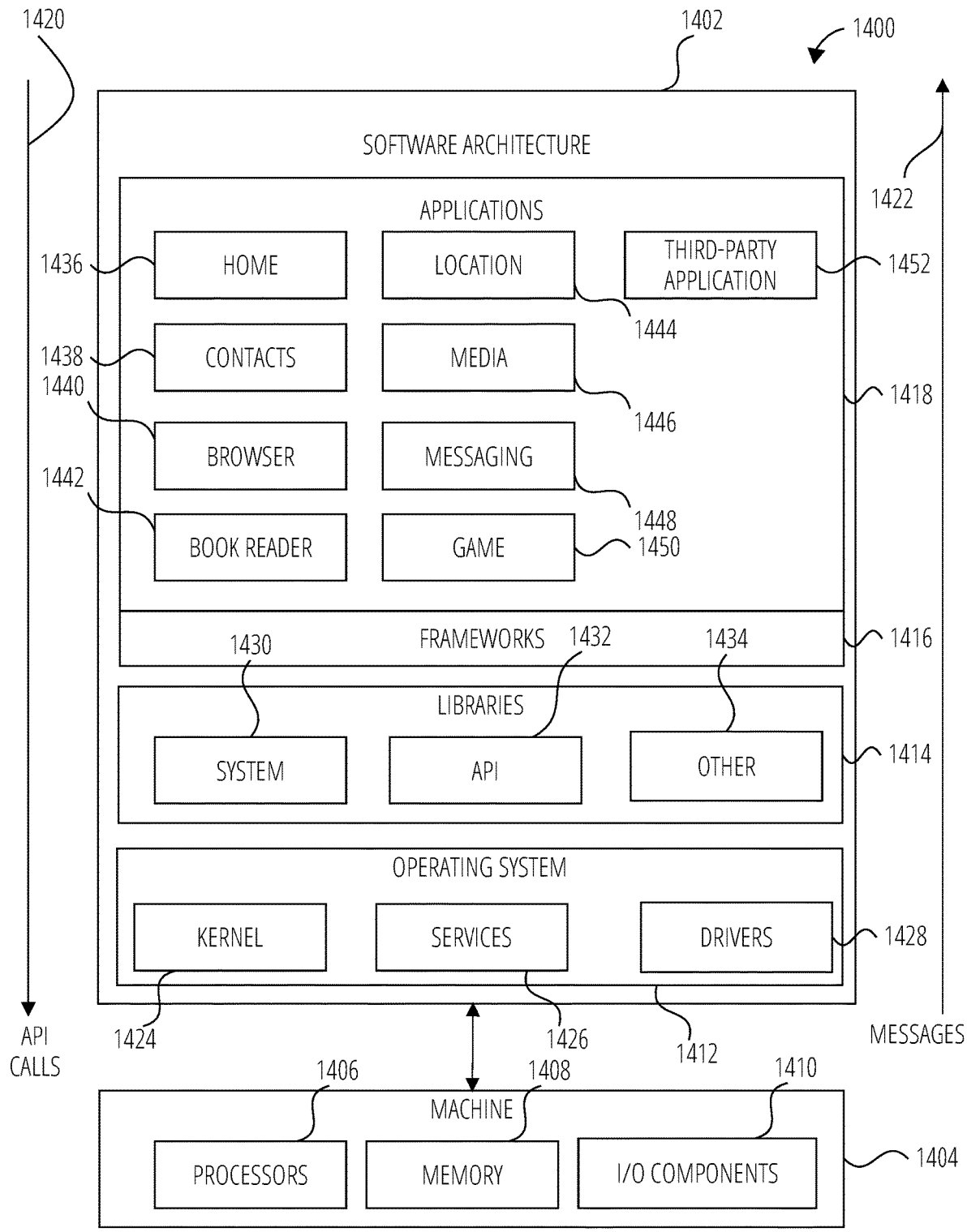
FIG. 14 is a block diagram showing a software architecture within which examples may be implemented.

FIG. 14 is a block diagram 1400 illustrating a software architecture 1402, which can be installed on any one or more of the devices described herein. The software architecture 1402 is supported by hardware such as a machine 1404 that includes processors 1406, memory 1408, and I/O components 1410. In this example, the software architecture 1402 can be conceptualized as a stack of layers, where each layer provides a particular functionality. The software architecture 1402 includes layers such as an operating system 1412, libraries 1414, frameworks 1416, and applications 1418. Operationally, the applications 1418 invoke API calls 1420 through the software stack and receive messages 1422 in response to the API calls 1420.

The operating system 1412 manages hardware resources and provides common services. The operating system 1412 includes, for example, a kernel 1424, services 1426, and drivers 1428. The kernel 1424 acts as an abstraction layer between the hardware and the other software layers. For example, the kernel 1424 provides memory management, processor management (e.g., scheduling), component management, networking, and security settings, among other functionalities. The services 1426 can provide other common services for the other software layers. The drivers 1428 are responsible for controlling or interfacing with the underlying hardware. For instance, the drivers 1428 can include display drivers, camera drivers, BLUETOOTH® or BLUETOOTH® Low Energy drivers, flash memory drivers, serial communication drivers (e.g., USB drivers), WI-FI® drivers, audio drivers, power management drivers, and so forth.

The libraries 1414 provide a common low-level infrastructure used by the applications 1418. The libraries 1414 can include system libraries 1430 (e.g., C standard library) that provide functions such as memory allocation functions, string manipulation functions, mathematic functions, and the like. In addition, the libraries 1414 can include API libraries 1432 such as media libraries (e.g., libraries to support presentation and manipulation of various media formats such as Moving Picture Experts Group-4 (MPEG4), Advanced Video Coding (H.264 or AVC), Moving Picture Experts Group Layer-3 (MP3), Advanced Audio Coding (AAC), Adaptive Multi-Rate (AMR) audio codec, Joint Photographic Experts Group (JPEG or JPG), or Portable Network Graphics (PNG)), graphics libraries (e.g., an OpenGL framework used to render in two dimensions (2D) and three dimensions (3D) in a graphic content on a display), database libraries (e.g., SQLite to provide various relational database functions), web libraries (e.g., WebKit to provide web browsing functionality), and the like. The libraries 1414 can also include a wide variety of other libraries 1434 to provide many other APIs to the applications 1418.

The frameworks 1416 provide a common high-level infrastructure that is used by the applications 1418. For example, the frameworks 1416 provide various graphical user interface (GUI) functions, high-level resource management, and high-level location services. The frameworks 1416 can provide a broad spectrum of other APIs that can be used by the applications 1418, some of which may be specific to a particular operating system or platform.

In an example, the applications 1418 may include a home application 1436, a contacts application 1438, a browser application 1440, a book reader application 1442, a location application 1444, a media application 1446, a messaging application 1448, a game application 1450, and a broad assortment of other applications such as a third-party application 1452. The applications 1418 are programs that execute functions defined in the programs. Various programming languages can be employed to create one or more of the applications 1418, structured in a variety of manners, such as object-oriented programming languages (e.g., Objective-C, Java, or C++) or procedural programming languages (e.g., C or assembly language). In a specific example, the third-party application 1452 (e.g., an application developed using the ANDROID™ or IOS™ software development kit (SDK) by an entity other than the vendor of the particular platform) may be mobile software running on a mobile operating system such as IOS™, ANDROID™, WINDOWS® Phone, or another mobile operating system. In this example, the third-party application 1452 can invoke the API calls 1420 provided by the operating system 1412 to facilitate functionalities described herein.

EXAMPLES

In view of the above-described implementations of subject matter this application discloses the following list of examples, wherein one feature of an example in isolation or more than one feature of an example, taken in combination and, optionally, in combination with one or more features of one or more further examples are further examples also falling within the disclosure of this application.

Example 1 is a system comprising: at least one processor; and at least one memory component storing instructions that, when executed by the at least one processor, configure the at least one processor to perform operations comprising: causing presentation of a user input content item in a viewing interface of an interaction application executing on a user device, the user input content item having been shared by a sending user via an interaction system; detecting a press and hold operation by a viewing user of the interaction system related to the presentation of the user input content item; responsive to the detection of the press and hold operation, automatically transitioning the interaction application to a reply state; and within the reply state, activating a reply mechanism to enable the viewing user to generate a reply message to the sending user of the user input content item.

In Example 2, the subject matter of Example 1 includes, wherein the press and hold operation comprises a press and hold gesture applied to the viewing interface within which the user input content item is presented.

In Example 3, the subject matter of Example 2 includes, wherein the transitioning of the interaction application to the reply state comprises: detecting that the press and hold gesture is in progress; and responsive to detecting that the press and hold gesture is in progress, automatically transitioning the interaction application from a view state to a paused state, the interaction application remaining in the paused state until ending of the press and hold gesture.

In Example 4, the subject matter of Example 3 includes, the operations further comprising: within the paused state, detecting a release gesture by the viewing user; and responsive to the detection of the release gesture, automatically transitioning the interaction application from the paused state to the reply state.

In Example 5, the subject matter of any of Examples 3-4 includes, the operations further comprising: within the paused state, detecting a swiping gesture by the viewing user; and responsive to the detection of the swiping gesture, automatically transitioning the interaction application from the paused state back to the view state.

In Example 6, the subject matter of Example 5 includes, wherein the swiping gesture is a swipe down gesture applied to the viewing interface within which the user input content item is presented.

In Example 7, the subject matter of any of Examples 1-6 includes, wherein the user input content item is a first user input content item in a collection of user input content items, the collection being configured to present the user input content items one after another within the viewing interface, each for a predetermined period of time, and the collection being paused responsive to the detection of the press and hold operation such that the first user input content item remains presented within the viewing interface.

In Example 8, the subject matter of any of Examples 1-7 includes, wherein the user input content item is a video, the causing of the presentation of the user input content item comprising executing a playback of the video within the viewing interface, and the playback of the video within the viewing interface being paused responsive to the detection of the press and hold operation.

In Example 9, the subject matter of any of Examples 1-8 includes, wherein the reply mechanism comprises a reply interface to receive a further user input content item from the viewing user for communication to the sending user.

In Example 10, the subject matter of Example 9 includes, wherein the reply interface comprises a camera function to enable the viewing user to capture image data as part of the further user input content item for communication to the sending user.

In Example 11, the subject matter of Example 10 includes, wherein the image data comprises at least one of still image data or video image data.

In Example 12, the subject matter of any of Examples 9-11 includes, wherein the reply interface comprises a text input function to enable the viewing user to generate text data as part of the further user input content item for communication to the sending user.

In Example 13, the subject matter of any of Examples 1-12 includes, wherein the reply mechanism comprises a reply interface including a plurality of interface components overlaid on the viewing interface.

In Example 14, the subject matter of any of Examples 1-13 includes, wherein the reply mechanism enables the viewing user to address the reply message to a further user of the interaction system, in addition to the sending user of the user input content item.

In Example 15, the subject matter of Example 14 includes, wherein the activation of the reply mechanism comprises: causing presentation of a user addition graphical element, the user addition graphical element identifying the further user of the interaction system and being user-selectable to address the reply message to the further user of the interaction system.

In Example 16, the subject matter of Example 15 includes, wherein the user addition graphical element comprises an identifier of the further user and an add button, the add button being user-selectable to address the reply message to the further user of the interaction system.

In Example 17, the subject matter of any of Examples 15-16 includes, wherein the presentation of the user addition graphical element comprises: detecting that the further user of the interaction system is tagged in the user input content item of the sending user; and responsive to detecting that the further user of the interaction system is tagged in the user input content item of the sending user, causing presentation of the user addition graphical element in a reply interface.

In Example 18, the subject matter of any of Examples 1-17 includes, wherein the reply mechanism enables the viewing user to generate a further user input content item and to include the further user input content item in the reply message, the operations further comprising: transmitting the reply message to the sending user via the interaction system.

Example 19 is a method comprising: causing presentation of a user input content item in a viewing interface of an interaction application executing on a user device, the user input content item having been shared by a sending user via an interaction system; detecting a press and hold operation by a viewing user of the interaction system related to the presentation of the user input content item; responsive to the detection of the press and hold operation, automatically transitioning the interaction application to a reply state; and within the reply state, activating a reply mechanism to enable the viewing user to generate a reply message to the sending user of the user input content item.

Example 20 is a non-transitory computer-readable storage medium, the computer-readable storage medium including instructions that when executed by at least one computer, cause the at least one computer to perform operations comprising: causing presentation of a user input content item in a viewing interface of an interaction application executing on a user device, the user input content item having been shared by a sending user via an interaction system; detecting a press and hold operation by a viewing user of the interaction system related to the presentation of the user input content item; responsive to the detection of the press and hold operation, automatically transitioning the interaction application to a reply state; and within the reply state, activating a reply mechanism to enable the viewing user to generate a reply message to the sending user of the user input content item.

Example 21 is at least one machine-readable medium including instructions that, when executed by processing circuitry, cause the processing circuitry to perform operations to implement any of Examples 1-20.

Example 22 is an apparatus comprising means to implement any of Examples 1-20.

Example 23 is a system to implement any of Examples 1-20.

Example 24 is a method to implement any of Examples 1-20.

CONCLUSION

In examples described in the present disclosure, gestures such as a press and hold gesture or a swiping gesture are touch gestures directed at the (touch-sensitive) screen of a user device. It should be appreciated that, while examples described herein illustrate gesture-based interface transitions with reference to touch gestures, techniques described herein may be applied using other types of operations or gestures that do not involve direct touching of a screen or other component or device. Example gestures may be performed using any suitable user input element, e.g., a finger, a stylus, or other input device.

As used in this disclosure, phrases of the form "at least one of an A, a B, or a C," "at least one of A, B, or C," "at least one of A, B, and C," and the like, should be interpreted to select at least one from the group that comprises "A, B, and C." Unless explicitly stated otherwise in connection with a particular instance in this disclosure, this manner of phrasing does not mean "at least one of A, at least one of B, and at least one of C." As used in this disclosure, the example "at least one of an A, a B, or a C," would cover any of the following selections: {A}, {B}, {C}, {A, B}, {A, C}, {B, C}, and {A, B, C}.

Unless the context clearly requires otherwise, throughout the description and the claims, the words "comprise," "comprising," and the like are to be construed in an inclusive sense, as opposed to an exclusive or exhaustive sense, i.e., in the sense of "including, but not limited to." As used herein, the terms "connected," "coupled," or any variant thereof means any connection or coupling, either direct or indirect, between two or more elements; the coupling or connection between the elements can be physical, logical, or a combination thereof.

Additionally, the words "herein," "above," "below," and words of similar import, when used in this application, refer to this application as a whole and not to any particular portions of this application. Where the context permits, words using the singular or plural number may also include the plural or singular number respectively. The word "or" in reference to a list of two or more items, covers all of the following interpretations of the word: any one of the items in the list, all of the items in the list, and any combination of the items in the list. Likewise, the term "and/or" in reference to a list of two or more items, covers all of the following interpretations of the word: any one of the items in the list, all of the items in the list, and any combination of the items in the list.

Although some examples, e.g., those depicted in the drawings, include a particular sequence of operations, the sequence may be altered without departing from the scope of the present disclosure. For example, some of the operations depicted may be performed in parallel or in a different sequence that does not materially affect the functions as described in the examples. In other examples, different components of an example device or system that implements an example method may perform functions at substantially the same time or in a specific sequence.

Glossary

"Carrier signal" refers to any intangible medium that is capable of storing, encoding, or carrying instructions for execution by the machine and includes digital or analog communications signals or other intangible media to facilitate communication of such instructions. Instructions may be transmitted or received over a network using a transmission medium via a network interface device.

"Client device," or "user device," refers to any machine that interfaces to a communications network to obtain resources from one or more server systems or other client devices. A client device may be, but is not limited to, a mobile phone, desktop computer, laptop, portable digital assistants (PDAs), smartphones, tablets, ultrabooks, netbooks, laptops, multi-processor systems, microprocessor-based or programmable consumer electronics, game consoles, set-top boxes, or any other communication device that a user may use to access a network.

"Communication network" refers to one or more portions of a network that may be an ad hoc network, an intranet, an extranet, a virtual private network (VPN), a local area network (LAN), a wireless LAN (WLAN), a wide area network (WAN), a wireless WAN (WWAN), a metropolitan area network (MAN), the Internet, a portion of the Internet, a portion of the Public Switched Telephone Network (PSTN), a plain old telephone service (POTS) network, a cellular telephone network, a wireless network, a Wi-Fi® network, another type of network, or a combination of two or more such networks. For example, a network or a portion of a network may include a wireless or cellular network, and the coupling may be a Code Division Multiple Access (CDMA) connection, a Global System for Mobile communications (GSM) connection, or other types of cellular or wireless coupling. In this example, the coupling may implement any of a variety of types of data transfer technology, such as Single Carrier Radio Transmission Technology (1xRTT), Evolution-Data Optimized (EVDO) technology, General Packet Radio Service (GPRS) technology, Enhanced Data rates for GSM Evolution (EDGE) technology, third Generation Partnership Project (3GPP) including 3G, fourth-generation wireless (4G) networks, Universal Mobile Telecommunications System (UMTS), High Speed Packet Access (HSPA), Worldwide Interoperability for Microwave Access (WiMAX), Long Term Evolution (LTE) standard, others defined by various standard-setting organizations, other long-range protocols, or other data transfer technology.

"Component" refers to a device, physical entity, or logic having boundaries defined by function or subroutine calls, branch points, APIs, or other technologies that provide for the partitioning or modularization of particular processing or control functions. Components may be combined via their interfaces with other components to carry out a machine process. A component may be a packaged functional hardware unit designed for use with other components and a part of a program that usually performs a particular function of related functions. Components may constitute either software components (e.g., code embodied on a machine-readable medium) or hardware components. A "hardware component" is a tangible unit capable of performing certain operations and may be configured or arranged in a certain physical manner. In various examples, one or more computer systems (e.g., a standalone computer system, a client computer system, or a server computer system) or one or more hardware components of a computer system (e.g., a processor or a group of processors) may be configured by software (e.g., an application or application portion) as a hardware component that operates to perform certain operations as described herein. A hardware component may also be implemented mechanically, electronically, or any suitable combination thereof. For example, a hardware component may include dedicated circuitry or logic that is permanently configured to perform certain operations. A hardware component may be a special-purpose processor, such as a field-programmable gate array (FPGA) or an application-specific integrated circuit (ASIC). A hardware component may also include programmable logic or circuitry that is temporarily configured by software to perform certain operations. For example, a hardware component may include software executed by a general-purpose processor or other programmable processors. Once configured by such software, hardware components become specific machines (or specific components of a machine) uniquely tailored to perform the configured functions and are no longer general-purpose processors. It will be appreciated that the decision to implement a hardware component mechanically, in dedicated and permanently configured circuitry, or in temporarily configured circuitry (e.g., configured by software), may be driven by cost and time considerations. Accordingly, the phrase "hardware component" (or "hardware-implemented component") should be understood to encompass a tangible entity, be that an entity that is physically constructed, permanently configured (e.g., hardwired), or temporarily configured (e.g., programmed) to operate in a certain manner or to perform certain operations described herein. Considering examples in which hardware components are temporarily configured (e.g., programmed), each of the hardware components need not be configured or instantiated at any one instance in time. For example, where a hardware component comprises a general-purpose processor configured by software to become a special-purpose processor, the general-purpose processor may be configured as respectively different special-purpose processors (e.g., comprising different hardware components) at different times. Software accordingly configures a particular processor or processors, for example, to constitute a particular hardware component at one instance of time and to constitute a different hardware component at a different instance of time. Hardware components can provide information to, and receive information from, other hardware components. Accordingly, the described hardware components may be regarded as being communicatively coupled. Where multiple hardware components exist contemporaneously, communications may be achieved through signal transmission (e.g., over appropriate circuits and buses) between or among two or more of the hardware components. In examples in which multiple hardware components are configured or instantiated at different times, communications between such hardware components may be achieved, for example, through the storage and retrieval of information in memory structures to which the multiple hardware components have access. For example, one hardware component may perform an operation and store the output of that operation in a memory device to which it is communicatively coupled. A further hardware component may then, at a later time, access the memory device to retrieve and process the stored output. Hardware components may also initiate communications with input or output devices, and can operate on a resource (e.g., a collection of information). The various operations of example methods described herein may be performed, at least partially, by one or more processors that are temporarily configured (e.g., by software) or permanently configured to perform the relevant operations. Whether temporarily or permanently configured, such processors may constitute processor-implemented components that operate to perform one or more operations or functions described herein. As used herein, "processor-implemented component" refers to a hardware component implemented using one or more processors. Similarly, the methods described herein may be at least partially processor-implemented, with a particular processor or processors being an example of hardware. For example, at least some of the operations of a method may be performed by one or more processors or processor-implemented components. Moreover, the one or more processors may also operate to support performance of the relevant operations in a "cloud computing" environment or as a "software as a service" (SaaS). For example, at least some of the operations may be performed by a group of computers (as examples of machines including processors), with these operations being accessible via a network (e.g., the Internet) and via one or more appropriate interfaces (e.g., an API). The performance of certain of the operations may be distributed among the processors, not only residing within a single machine, but deployed across a number of machines. In some examples, the processors or processor-implemented components may be located in a single geographic location (e.g., within a home environment, an office environment, or a server farm). In other examples, the processors or processor-implemented components may be distributed across a number of geographic locations.

"Computer-readable storage medium" refers to both machine-storage media and transmission media. Thus, the terms include both storage devices/media and carrier waves/modulated data signals. The terms "machine-readable medium," "computer-readable medium" and "device-readable medium" mean the same thing and may be used interchangeably in this disclosure.

"Ephemeral message" refers to a message that is accessible for a time-limited duration. An ephemeral message may be a text, an image, a video and the like. The access time for the ephemeral message may be set by the message sender. Alternatively, the access time may be a default setting or a setting specified by the recipient. Regardless of the setting technique, the message is transitory.

"Machine storage medium" refers to a single or multiple storage devices and media (e.g., a centralized or distributed database, and associated caches and servers) that store executable instructions, routines and data. The term shall accordingly be taken to include, but not be limited to, solid-state memories, and optical and magnetic media, including memory internal or external to processors. Specific examples of machine-storage media, computer-storage media and device-storage media include non-volatile memory, including by way of example semiconductor memory devices, e.g., erasable programmable read-only memory (EPROM), electrically erasable programmable read-only memory (EEPROM), FPGA, and flash memory devices; magnetic disks such as internal hard disks and removable disks; magneto-optical disks; and CD-ROM and DVD-ROM disks. The terms "machine-storage medium," "device-storage medium," "computer-storage medium" mean the same thing and may be used interchangeably in this disclosure. The terms "machine-storage media," "computer-storage media," and "device-storage media" specifically exclude carrier waves, modulated data signals, and other such media, at least some of which are covered under the term "signal medium."

"Non-transitory computer-readable storage medium" refers to a tangible medium that is capable of storing, encoding, or carrying the instructions for execution by a machine.

"Signal medium" refers to any intangible medium that is capable of storing, encoding, or carrying the instructions for execution by a machine and includes digital or analog communications signals or other intangible media to facilitate communication of software or data. The term "signal medium" shall be taken to include any form of a modulated data signal, carrier wave, and so forth. The term "modulated data signal" means a signal that has one or more of its characteristics set or changed in such a manner as to encode information in the signal. The terms "transmission medium" and "signal medium" mean the same thing and may be used interchangeably in this disclosure.

"User input content" refers to any form of content that may be posted, published, shared, sent, received or interacted with by a user, e.g., using an online platform. User input content may, for example, include digital content in the form of one or more image, photo, video clip, audio clip, text, or a combination thereof. A user input content item may, in some examples, be a UGC (user-generated content) item. User input content may, for example, have an augmentation applied to it (e.g., a lens, a filter, a media overlay, or other augmentation). A user input content item may be generated by a user, for example, where the content item is captured by a user using a digital camera of a user device, or, for example, where the content item is created by the user by applying an augmentation to another content item. A user input content item may be user-selected, for example, where the content item is selected from a media library or file storage, or, for example, sourced from a third party or third-party device. User input content may also include partially or fully computer-generated content, e.g., content created through generative artificial intelligence. A content item may, for example, be content data, such as a picture, video or audio data (or combinations thereof).

What is claimed is:

1. A system comprising:
   at least one processor; and
   at least one memory component storing instructions that, when executed by the at least one processor, configure the at least one processor to perform operations comprising:
      causing presentation of a content item in a viewing interface of an interaction application executing on a user device, the content item shared by a sending user via an interaction system, wherein the content item is a first content item in a story, the story comprising multiple content items to be presented in a sequence one after another within the viewing interface in a view state;

detecting a press and hold gesture applied to the viewing interface, while the first content item is presented therein, by a viewing user of the interaction system;

in response to the detection of the press and hold gesture, causing a transition of the interaction application from the view state to a paused state, the interaction application remaining in the paused state until ending of the press and hold gesture, wherein the story is paused in the paused state such that the first content item remains presented within the viewing interface;

detecting a further gesture that causes the ending of the press and hold gesture;

identifying, from among a plurality of gesture types supported by the interaction application for the ending of the press and hold gesture, a gesture type of the further gesture, the plurality of gesture types comprising:

a release gesture that causes transitioning of the interaction application from the paused state to a reply state, the reply state activating a reply mechanism to enable the viewing user to generate a reply message to the sending user of the content item, and a swiping gesture that causes transitioning of the interaction application from the paused state back to the view state; and causing a further transition of the interaction application based on the gesture type of the further gesture.

2. The system of claim 1, wherein the swiping gesture is a swipe down gesture applied to the viewing interface within which the content item is presented.

3. The system of claim 1, wherein the content item is a video, the causing of the presentation of the content item comprising executing a playback of the video within the viewing interface, and the playback of the video within the viewing interface being paused in the paused state.

4. The system of claim 1, wherein the reply mechanism comprises a reply interface to receive a further content item from the viewing user for communication to the sending user.

5. The system of claim 4, wherein the reply interface comprises a camera function to enable the viewing user to capture image data as part of the further content item for communication to the sending user.

6. The system of claim 5, wherein the image data comprises at least one of still image data or video image data.

7. The system of claim 4, wherein the reply interface comprises a text input function to enable the viewing user to generate text data as part of the further content item for communication to the sending user.

8. The system of claim 1, wherein the reply mechanism comprises a reply interface including a plurality of interface components overlaid on the viewing interface.

9. The system of claim 1, wherein the reply mechanism enables the viewing user to address the reply message to a further user of the interaction system, in addition to the sending user of the content item.

10. The system of claim 9, wherein the activation of the reply mechanism comprises:

causing presentation of a user addition graphical element, the user addition graphical element identifying the further user of the interaction system and being user-selectable to address the reply message to the further user of the interaction system.

11. The system of claim 10, wherein the user addition graphical element comprises an identifier of the further user and an add button, the add button being user-selectable to address the reply message to the further user of the interaction system.

12. The system of claim 10, wherein the presentation of the user addition graphical element comprises:

detecting that the further user of the interaction system is tagged in the content item of the sending user; and in response to detecting that the further user of the interaction system is tagged in the content item of the sending user, causing presentation of the user addition graphical element in a reply interface.

13. The system of claim 1, wherein the reply mechanism enables the viewing user to generate a further content item and to include the further content item in the reply message, the operations further comprising: transmitting the reply message to the sending user via the interaction system.

14. A method comprising:

causing presentation of a content item in a viewing interface of an interaction application executing on a user device, the content item shared by a sending user via an interaction system, wherein the content item is a first content item in a story, the story comprising multiple content items to be presented in a sequence one after another within the viewing interface in a view state;

detecting a press and hold gesture applied to the viewing interface, while the first content item is presented therein, by a viewing user of the interaction system;

in response to the detection of the press and hold gesture, causing a transition of the interaction application from the view state to a paused state, the interaction application remaining in the paused state until ending of the press and hold gesture, wherein the story is paused in the paused state such that the first content item remains presented within the viewing interface;

detecting a further gesture that causes the ending of the press and hold gesture;

identifying, from among a plurality of gesture types supported by the interaction application for the ending of the press and hold gesture, a gesture type of the further gesture, the plurality of gesture types comprising:

a release gesture that causes transitioning of the interaction application from the paused state to a reply state, the reply state activating a reply mechanism to enable the viewing user to generate a reply message to the sending user of the content item, and a swiping gesture that causes transitioning of the interaction application from the paused state back to the view state; and causing a further transition of the interaction application based on the gesture type of the further gesture.

15. The method of claim 14, wherein the content item is a video, the causing of the presentation of the content item comprising executing a playback of the video within the viewing interface, and the playback of the video within the viewing interface being paused in the paused state.

16. The method of claim 14, wherein the reply mechanism enables the viewing user to address the reply message to a further user of the interaction system, in addition to the sending user of the content item.

17. The method of claim 16, wherein the activation of the reply mechanism comprises: causing presentation of a user addition graphical element, the user addition graphical element identifying the further user of the interaction system and being user-selectable to address the reply message to the further user of the interaction system.

18. The method of claim 17, wherein the user addition graphical element comprises an identifier of the further user and an add button, the add button being user-selectable to address the reply message to the further user of the interaction system.

19. The method of claim 17, wherein the presentation of the user addition graphical element comprises:
   detecting that the further user of the interaction system is tagged in the content item of the sending user; and
   in response to detecting that the further user of the interaction system is tagged in the content item of the sending user, causing presentation of the user addition graphical element in a reply interface.

20. A non-transitory computer-readable storage medium, the computer-readable storage medium including instructions that when executed by at least one computer, cause the at least one computer to perform operations comprising:
   causing presentation of a content item in a viewing interface of an interaction application executing on a user device, the content item shared by a sending user via an interaction system, wherein the content item is a first content item in a story, the story comprising multiple content items to be presented in a sequence one after another within the viewing interface in a view state;
   detecting a press and hold gesture applied to the viewing interface, while the first content item is presented therein, by a viewing user of the interaction system;
   in response to the detection of the press and hold gesture, causing a transition of the interaction application from the view state to a paused state, the interaction application remaining in the paused state until ending of the press and hold gesture, wherein the story is paused in the paused state such that the first content item remains presented within the viewing interface;
   detecting a further gesture that causes the ending of the press and hold gesture;
   identifying, from among a plurality of gesture types supported by the interaction application for the ending of the press and hold gesture, a gesture type of the further gesture, the plurality of gesture types comprising:
      a release gesture that causes transitioning of the interaction application from the paused state to a reply state, the reply state activating a reply mechanism to enable the viewing user to generate a reply message to the sending user of the content item, and
      a swiping gesture that causes transitioning of the interaction application from the paused state back to the view state; and
   causing a further transition of the interaction application based on the gesture type of the further gesture.

* * * * *